March 25, 1958 A. J. FINDLAY 2,827,927
BEVERAGE DISPENSING MACHINE
Filed March 2, 1953 13 Sheets-Sheet 1
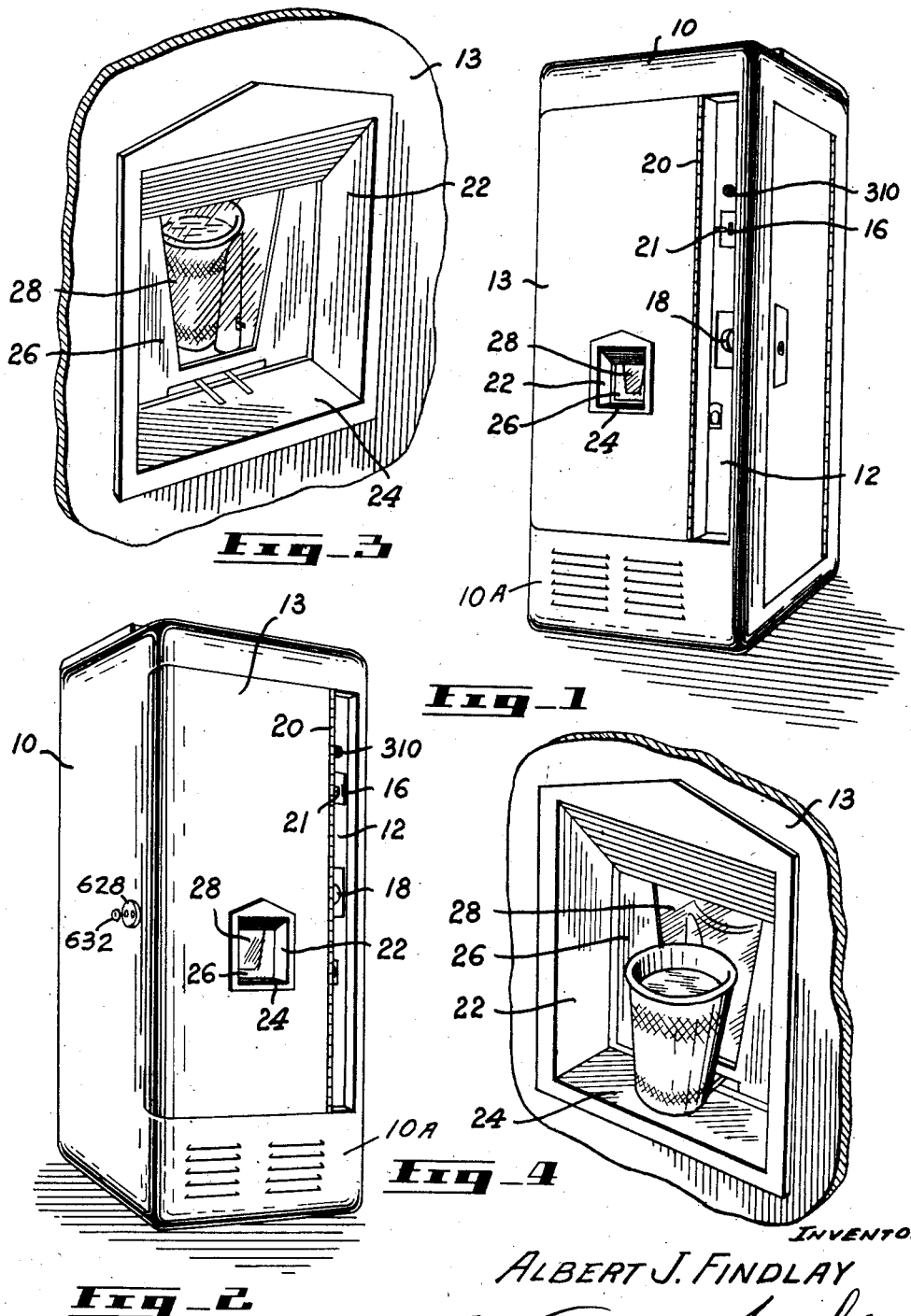
INVENTOR
ALBERT J. FINDLAY
BY Alan Awabey
ATTORNEY March 25, 1958 A. J. FINDLAY 2,827,927
BEVERAGE DISPENSING MACHINE
Filed March 2, 1953 13 Sheets-Sheet 2
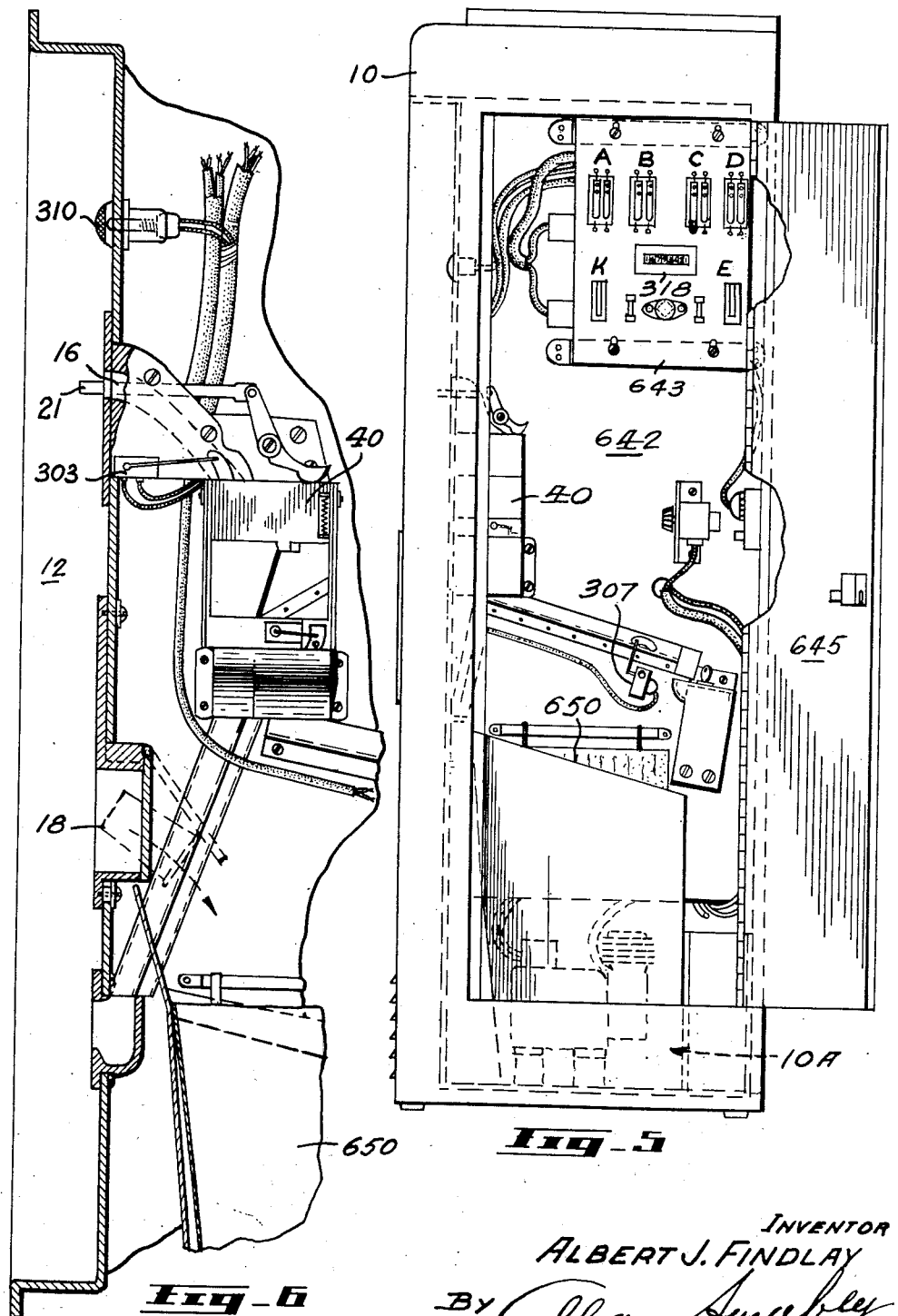
Fig_6  Fig_5
INVENTOR
ALBERT J. FINDLAY
BY
ATTORNEY March 25, 1958  A. J. FINDLAY  2,827,927
BEVERAGE DISPENSING MACHINE
Filed March 2, 1953  13 Sheets-Sheet 3

ALBERT J. FINDLAY
BY Alan Awabey
ATTORNEY

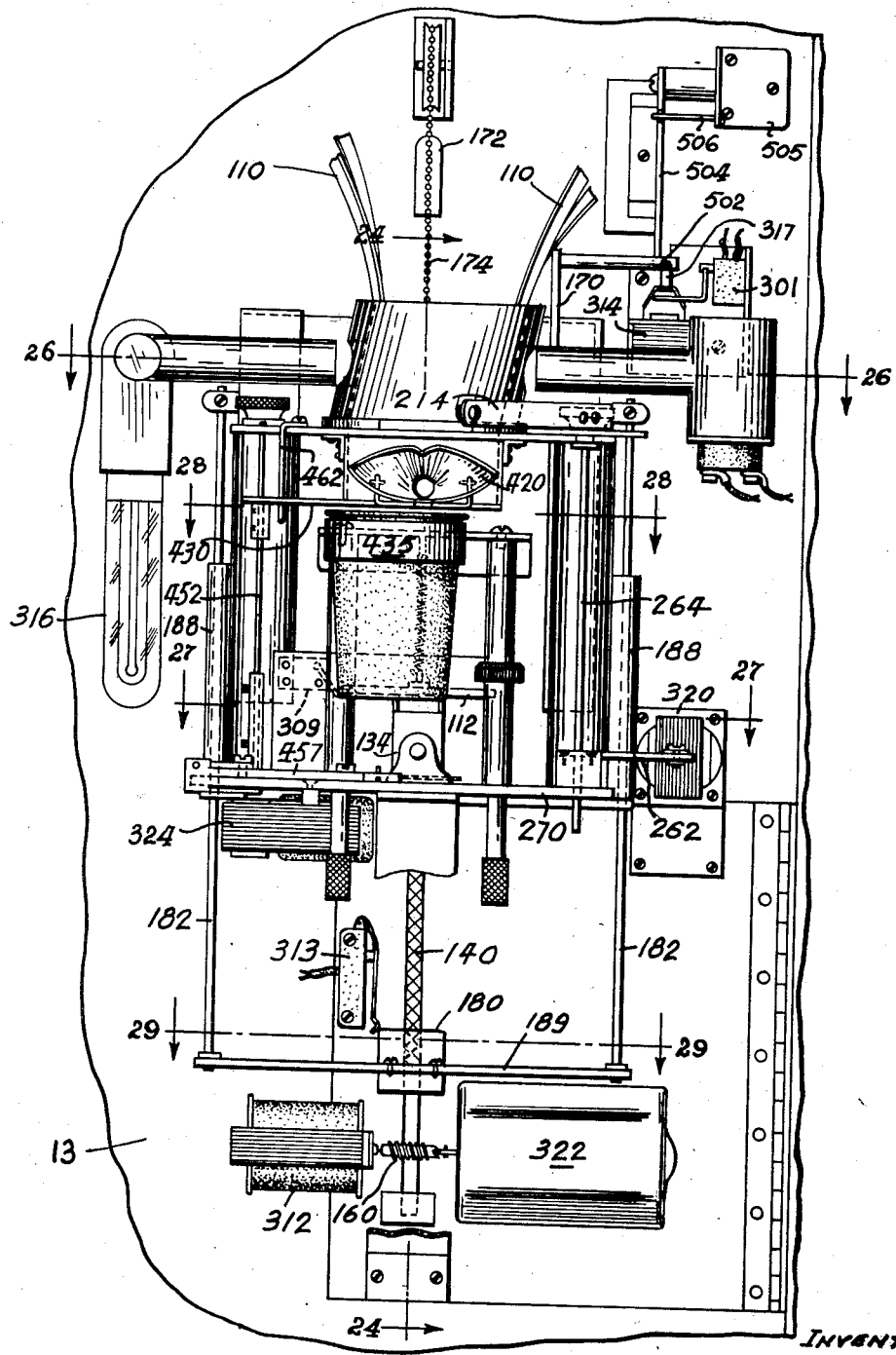

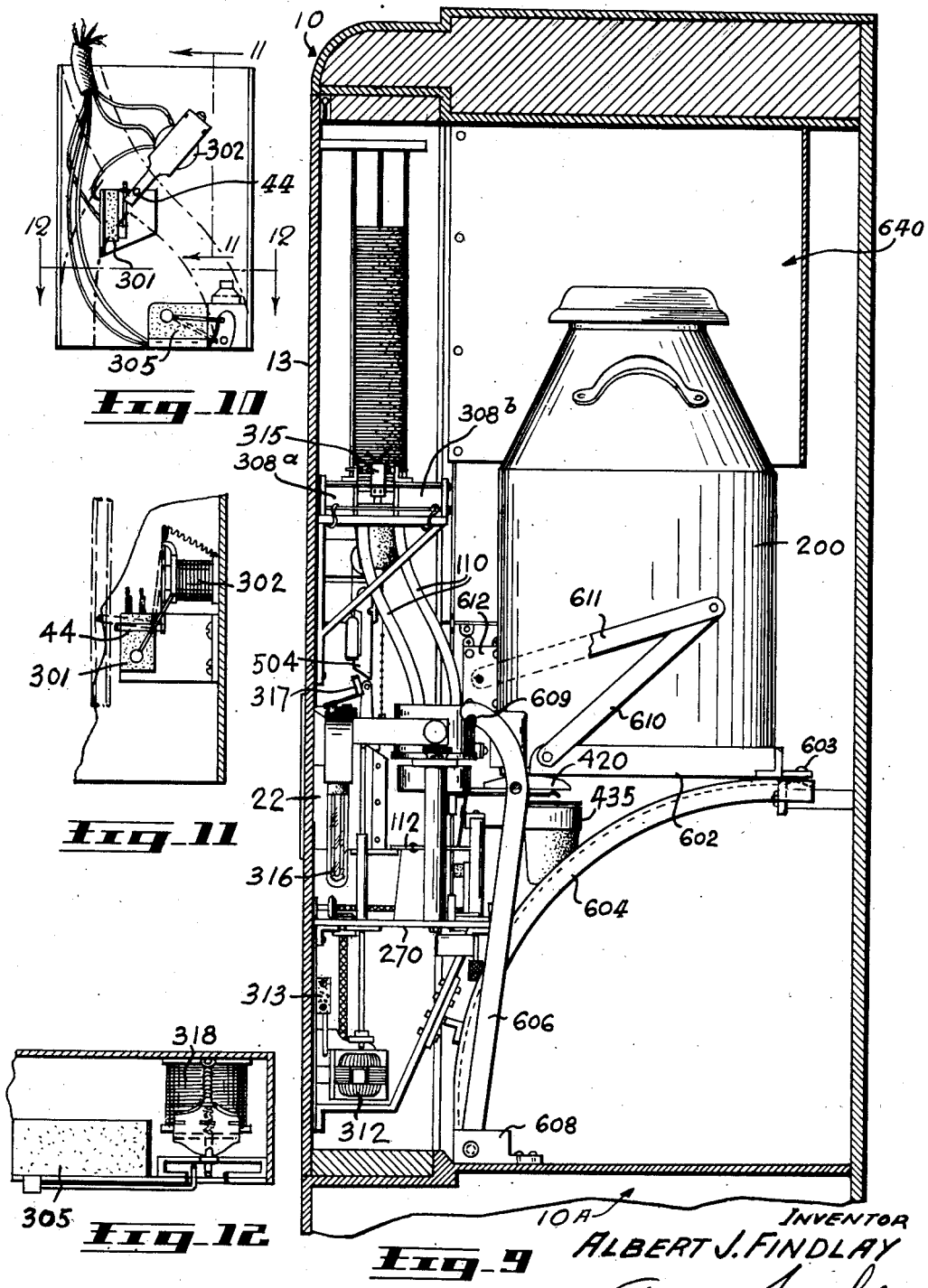

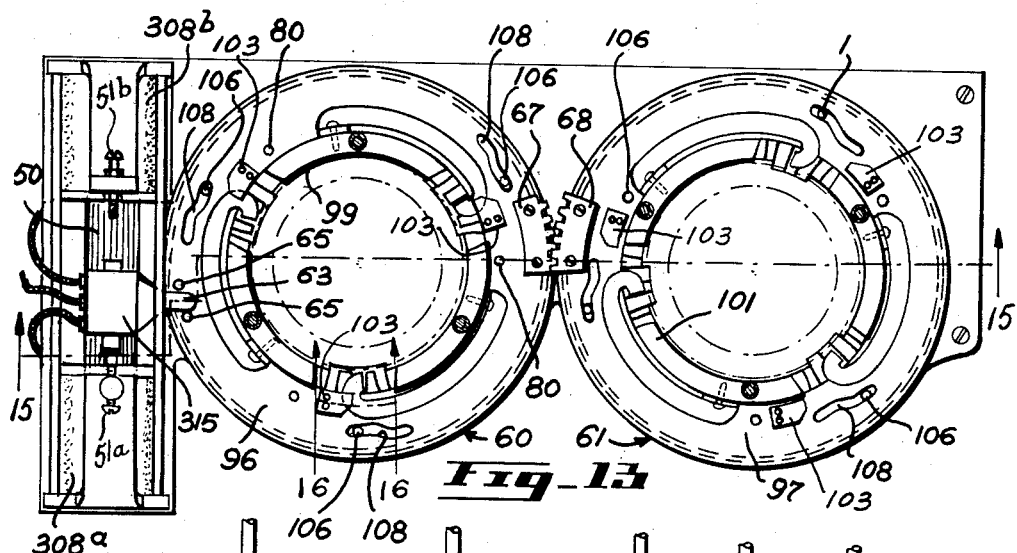
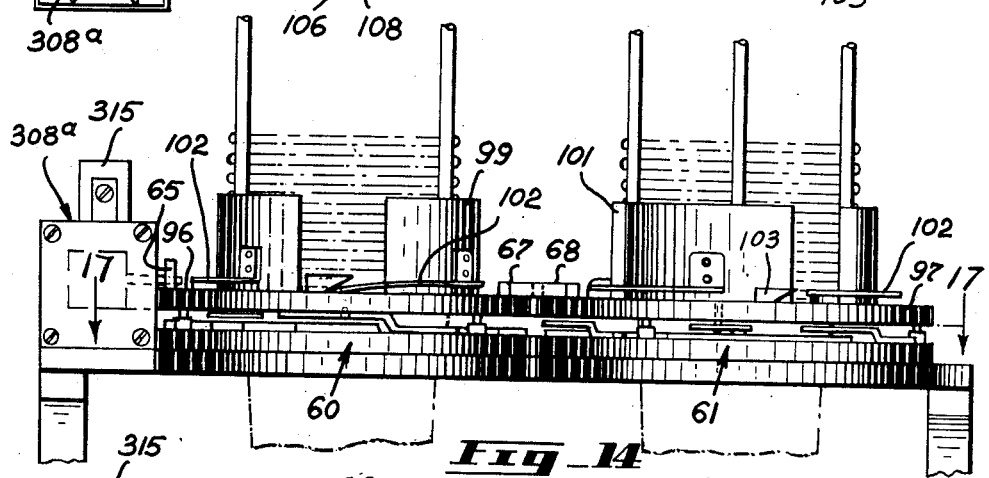
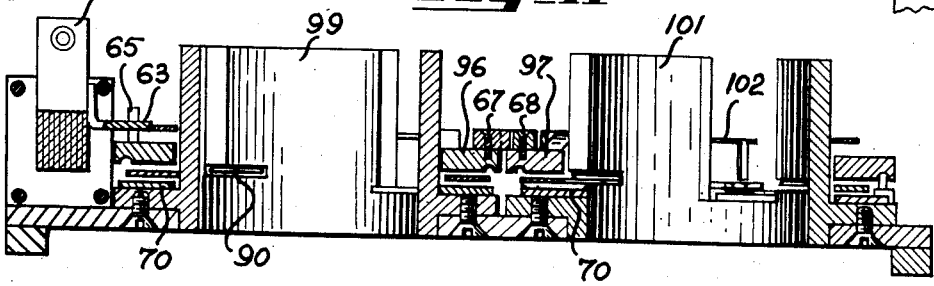
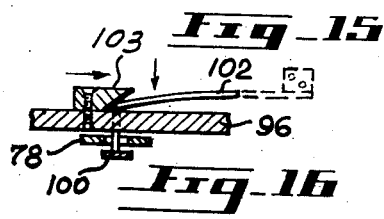

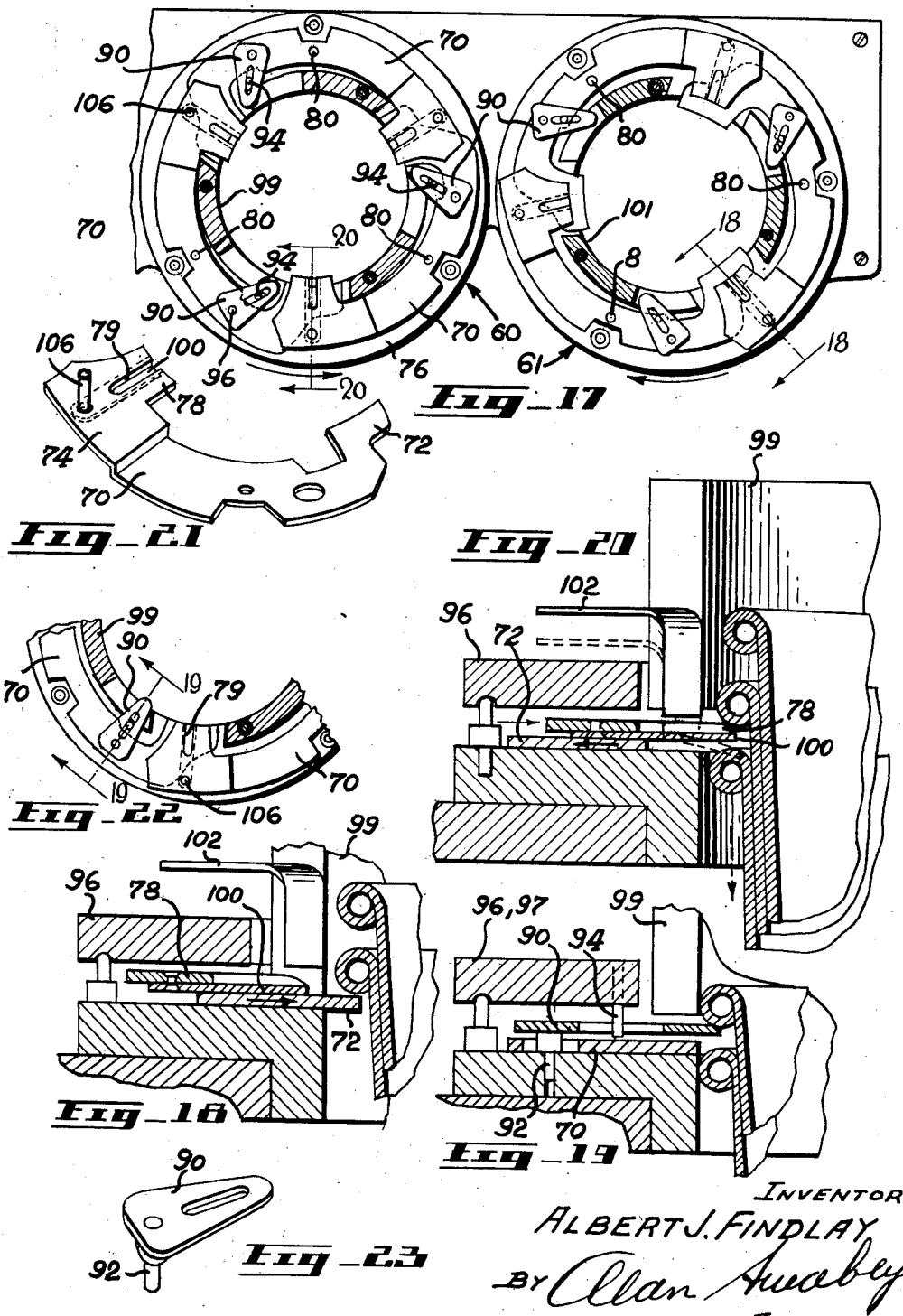

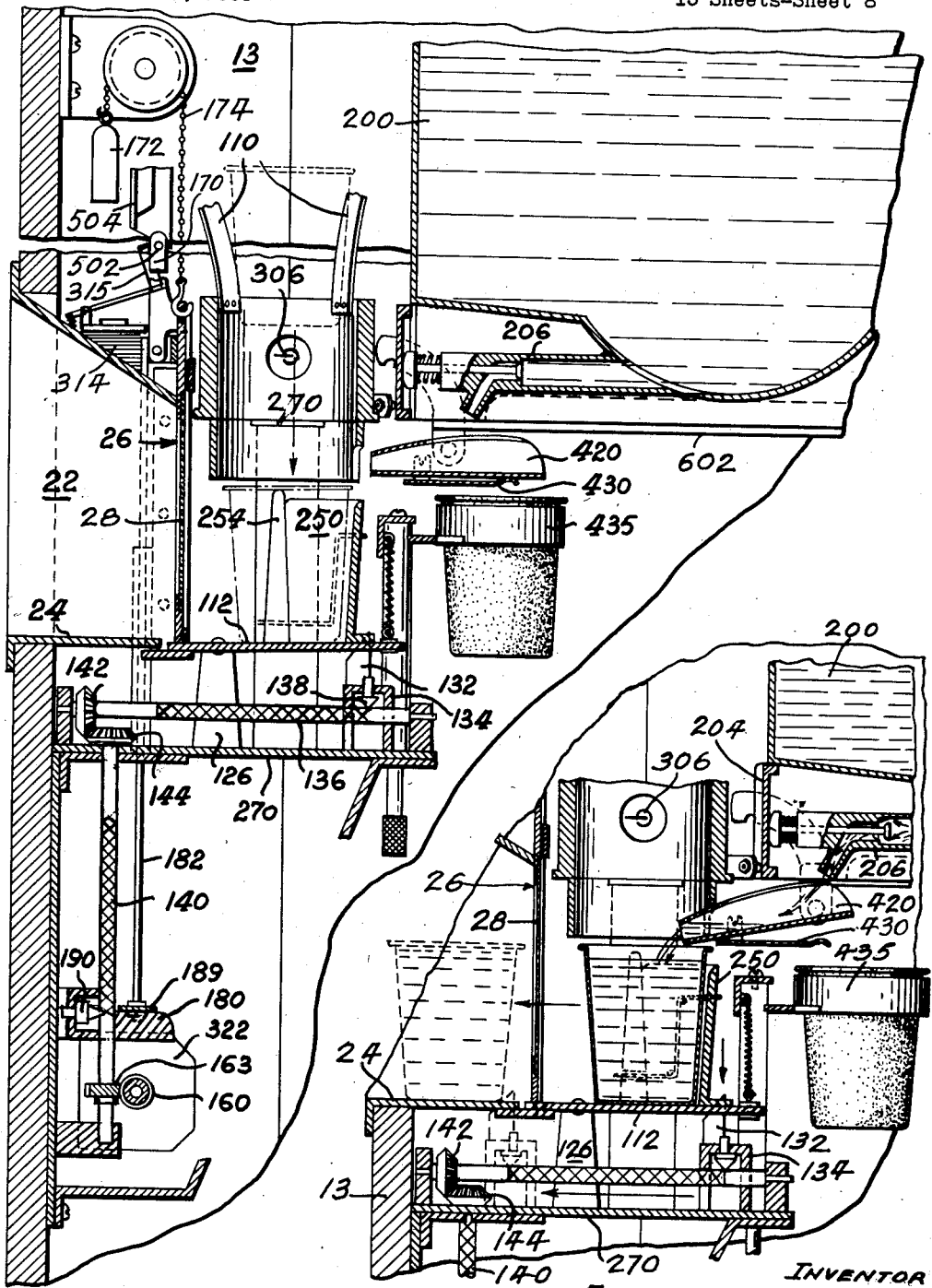

March 25, 1958  A. J. FINDLAY  2,827,927
BEVERAGE DISPENSING MACHINE
Filed March 2, 1953  13 Sheets-Sheet 9

INVENTOR
ALBERT J. FINDLAY
BY Alan Awabey
ATTORNEY

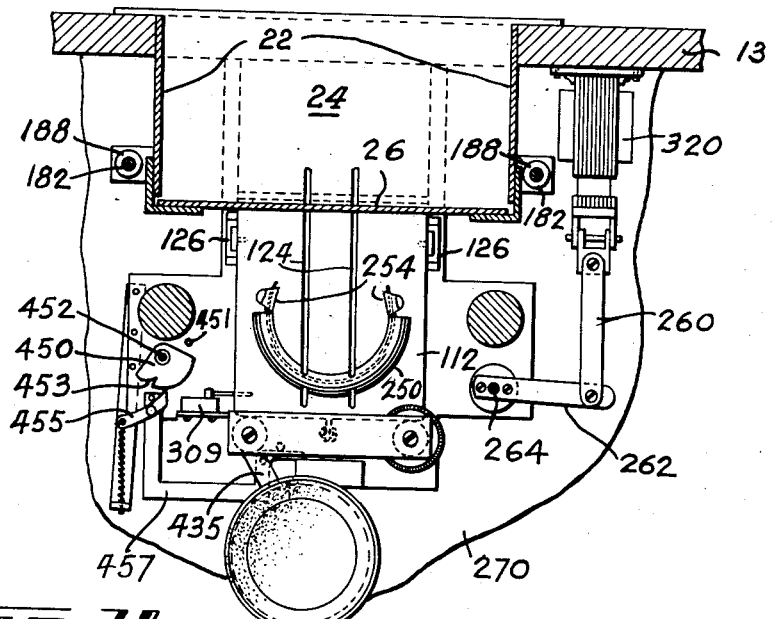
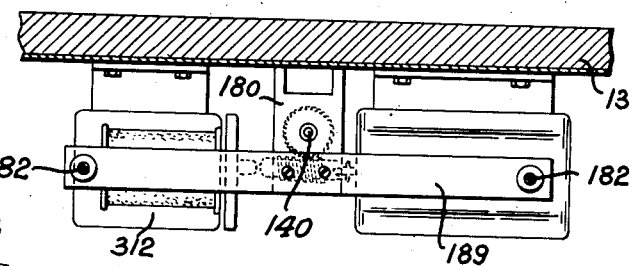
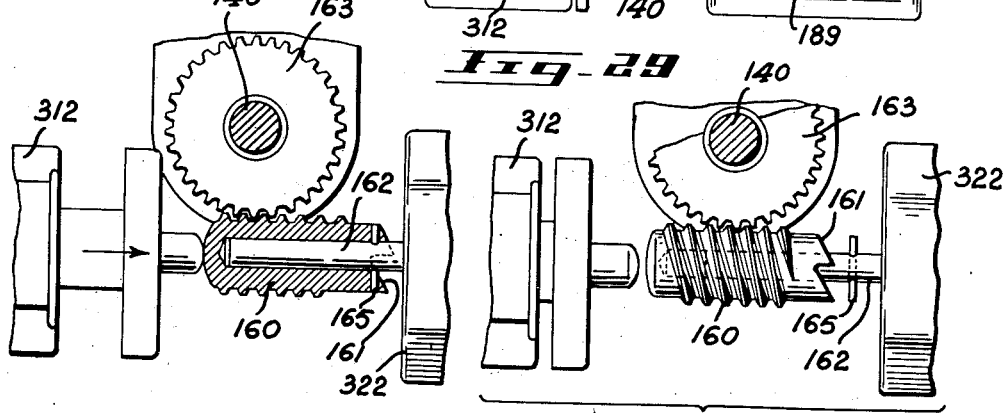

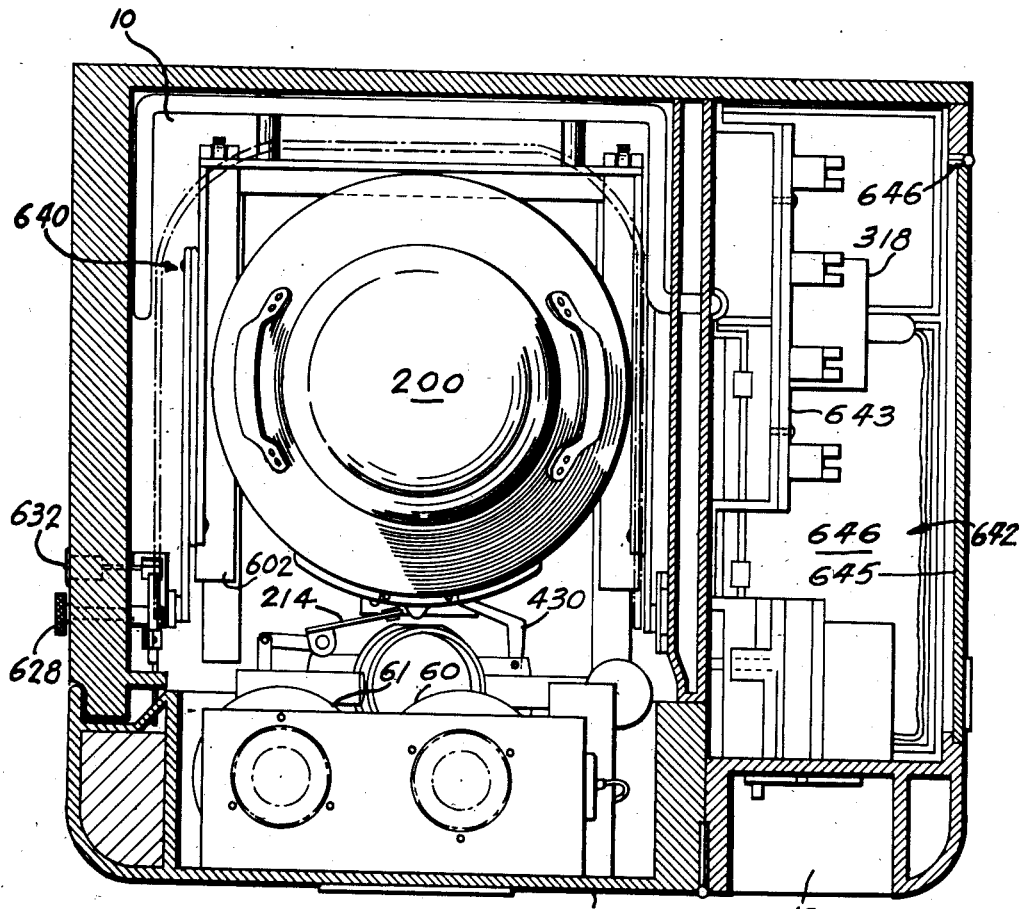
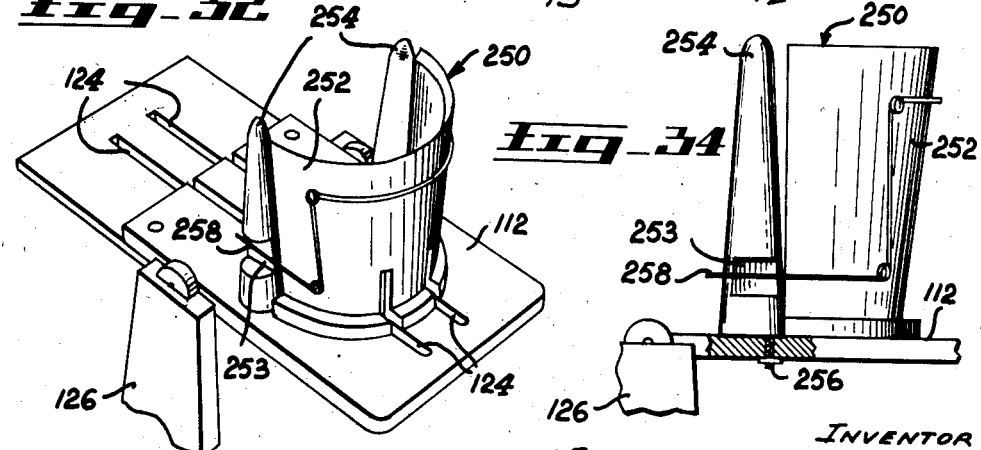
INVENTOR
ALBERT J. FINDLAY
BY Alan Awabey
ATTORNEY

March 25, 1958
A. J. FINDLAY
2,827,927
BEVERAGE DISPENSING MACHINE
Filed March 2, 1953
13 Sheets-Sheet 12
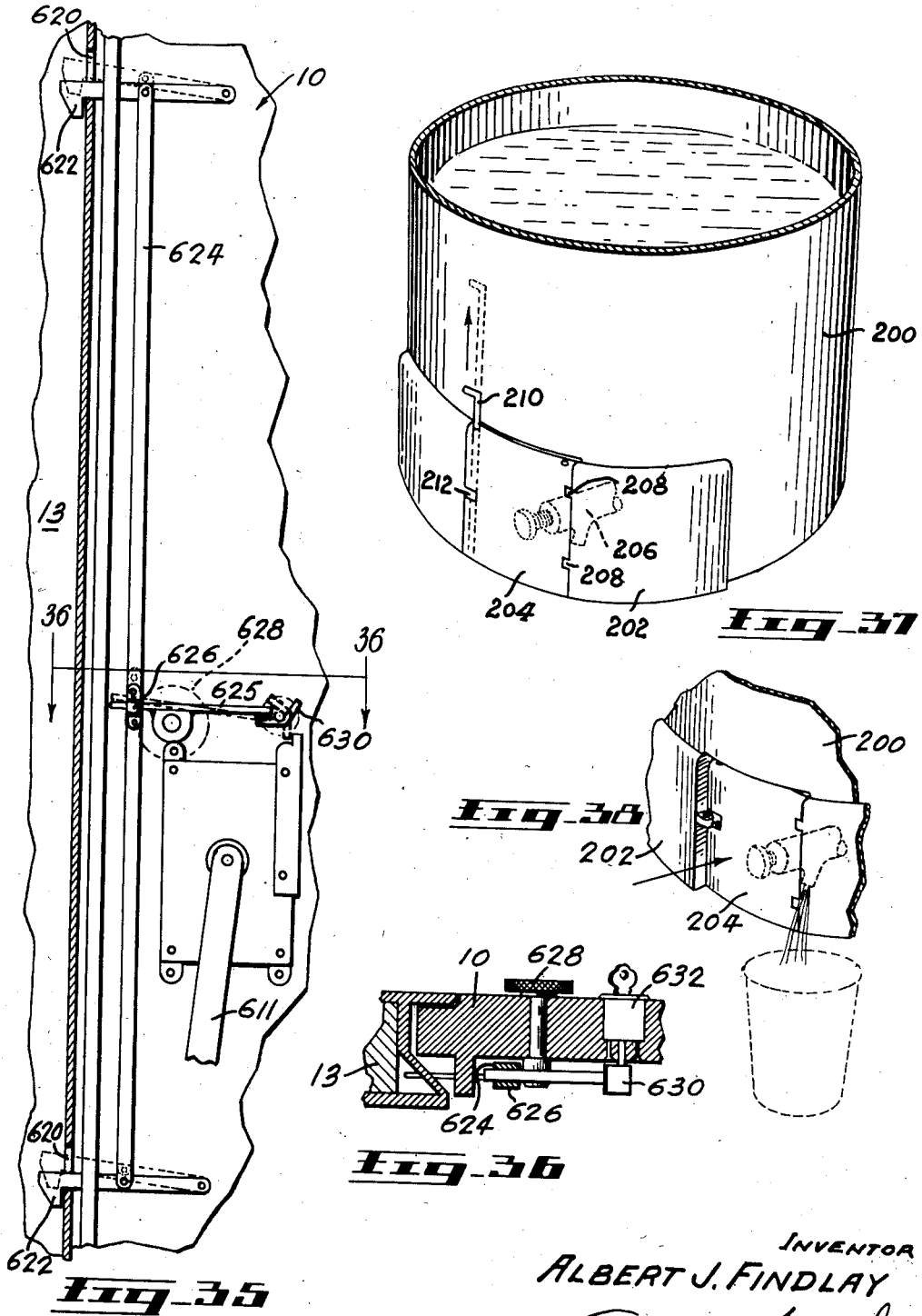
INVENTOR
ALBERT J. FINDLAY
BY Allan Awaley
ATTORNEY

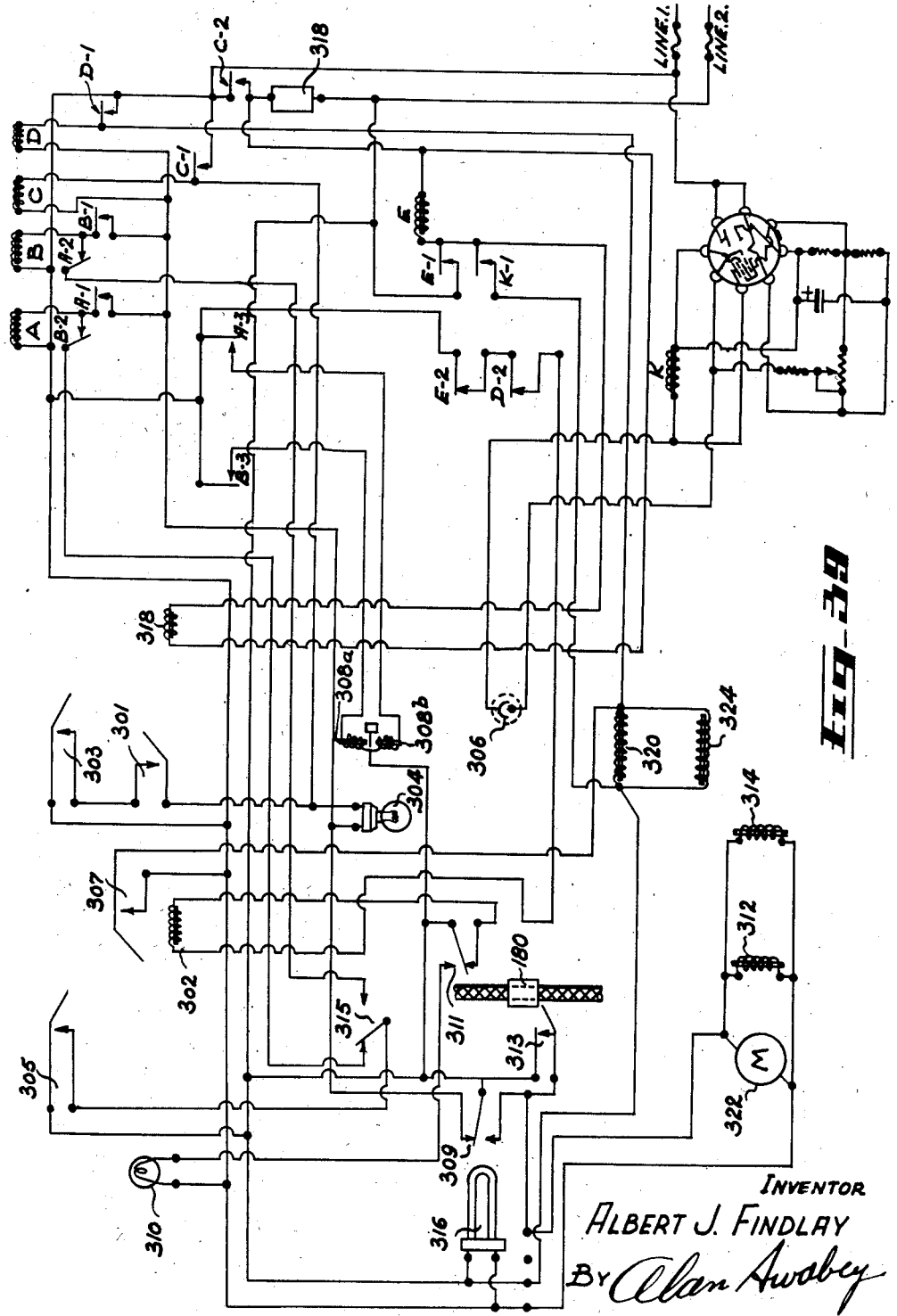

United States Patent Office 2,827,927
Patented Mar. 25, 1958

2,827,927

BEVERAGE DISPENSING MACHINE

Albert James Findlay, Montreal, Quebec, Canada, assignor to John F. Russell, Jr., New York, N. Y.

Application March 2, 1953, Serial No. 339,769

19 Claims. (Cl. 141—83)

The present invention relates to automatic beverage vending machines and more particularly to machines of this nature utilised for the vending of milk.

There are numerous coin-operating vending machines for supplying individual quantities of a beverage on deposit of a coin. These machines generally include a housing, a supply means for releasing a cup from a supply stack, often from a pair of stacks, and the setting in motion of a primary coin activated control mechanism, means actuated in timed relationship to the release of a cup to cause a predetermined amount of beverage to be dispensed from the reservoir so as to provide the consumer with a predetermined amount of the beverage. The dispensing position of the cup is usually within easy grasping access of the consumer's hand.

The applicant has developed an improved apparatus of this nature particularly adapted for dispensing milk. The improvements involve, generally speaking, the following aspects.

The applicant provides a combination in which means responsive to the movement of the released cup operate a supply valve causing the beverage to fall into the cup and means responsive to the amount of liquid in the cup turns off the valve. Preferably, the supply valve actuating means is actuated through the medium of a photoelectric eye, and preferably the valve is turned off by mechanism operated by the weight of the filled cup.

A feature which makes the applicant's device especially adaptable to dispensing milk is an arrangement in which the cup when in liquid dispensing position is within the housing out of reach and there is cup-advancing mechanism adapted to move the cup to a forward access position. Preferably, the housing has an opening between the receiving position and the access position and this opening is provided with a door.

In accordance with the invention the cup advancing mechanism is operated by mechanism responsive to the amount of liquid in the cup preferably through weighing instrumentalities and is automatically retracted at the end of the advancing cycle.

Preferably, the door actuating mechanism is operated by the movement of the cup-advancing mechanism so that the door is initially raised quickly to allow movement of the cup through the opening from the receiving position to the access position and then the door is returned relatively slowly so as to give the cup time to clear it on its way to access position. The inside of the housing is thus protected from contamination by preventing the consumer from putting his hand inside.

Another feature of the invention is a special cup releasing mechanism which is adapted selectively to discharge cups one at a time, in a positive manner.

An additional feature of the invention is a mechanism to facilitate placing a supply container for liquid for example a milk can, within the housing. This includes a track, a container-supporting base riding on the track and damping means for damping the movement of the base from upper to lower position so as to prevent the container and support from dropping too rapidly.

A still further feature of the invention is a special container which is in the form of a milk can having a bottom annular skirt projecting below a convex bottom on the container. The convex bottom is provided with an outlet having a valve which is inside the confines of the skirt. A portion of the normal skirt is cut out and replaced by a supplementary skirt portion having a hinge door adapted normally to overlie a valve. The hinged door is adapted to be depressed to operate the valve, but can be locked against depression so as to prevent inadvertent valve operation.

The cabinet enclosure or housing is constructed so as to completely and hygienically house all the mechanism necessary to accomplish the metering and delivery of the milk to the cup and the delivery of the cup when filled to the exterior of the cabinet. The portions of the apparatus utilised to carry out the various operations are actuated in time related sequence by a control system initially set in motion by the depositing of a coin. The control means embody safety features whereby visual indication is made if apparatus is not in correct operating condition, and means are also provided for the ejection of a coin if a filled milk container is not delivered.

It should be understood that the above is a brief summary of the invention in its various aspects and more details of these features will be defined in the description which follows.

Detailed description

Having thus generally described the nature of the invention particular reference will be made to the accompanying drawings wherein a preferred embodiment is shown by way of illustration, and in which:

Figure 1 is a diagrammatic view in perspective elevation showing the front and right side of the cabinet.

Figure 2 is a diagrammatic view correspondng to Figure 1 also in perspective elevation showing the front and left side of the cabinet construction.

Figure 3 is an enlarged detail view of a portion of the front of the cabinet including the dispensing window showing the door in closed position.

Figure 4 is a view corresponding to Figure 3 showing the door is closed position but with a filled milk container deposited outside.

Figure 5 is a side view of the construction shown in Figures 1 and 2 with the side door open to show in more detail the arrangement and construction of the controlling elements and the coin delivery chute.

Figure 6 is an enlarged detailed view partially in section of a portion of the construction shown in Figure 5 to illustrate in more detail the coin collection and rejection mechanism and also a used container disposal arrangement.

Figure 8 is an enlarged view of a portion of the construction shown in Figure 7 to illustrate in more detail the cup delivery portion of the apparatus.

Figure 9 is a sectional view of the construction shown in Figures 1 and 2 as looking from behind the control panel shown in Figure 5 so as to show in more detail the relative position of the milk delivery and dispensing mechanism and the milk supply container and its associated supporting mechanism.

Figure 10 is an enlarged diagrammatic detailed view of the electronic mechanism controlling the coin rejection portion of the coin collection apparatus shown in Figure 6.

Figure 11 is a cross sectional view of a portion of the construction shown in Figure 10 along the line 11—11 to illustrate the construction in more detail.

Figure 12 is a cross sectional view of the construction shown in Figure 10 along the line 12—12 to show in more detail the specific arrangement of the various elements.

Figure 13 is an enlarged diagrammatic view in plan of the top portion of the cup delivery mechanism along the line 13—13 of Figure 7 showing in more detail the co-operating cup selecting and releasing arrangement.

Figure 14 is an enlarged diagrammatic view in front elevation of the arrangement shown in Figure 13 to illustrate the assembly in more detail.

Figure 15 is a cross sectional view of the arrangement shown in Figure 13 along the line 15—15 to illustrate in more detail the construction of the cup selection delivery unit.

Figure 16 is an enlarged diagrammatic view in detail of the cup ejecting finger along the line 16—16 of Figure 13.

Figure 17 is an enlarged diagrammatic view in plan of the construction shown in Figure 13 along the line 17—17 with the top cover plate removed to illustrate the internal arrangement more clearly.

Figure 18 is an enlarged sectional view of a portion of the construction shown in Figure 17 and along the line 18—18 to show the starting position of the cup feeding fingers.

Figure 19 is an enlarged sectional view along the line 19—19 of Figure 22 showing the second movement of the cup selecting and ejecting mechanism.

Figure 20 is an enlarged sectional view along the line 20—20 of Figure 17 showing the final operation of the cup selecting and ejecting mechanism.

Figure 21 is an enlarged detail view of one of the movable finger plates as shown in Figure 17.

Figure 22 is an enlarged detail view of a portion of the construction shown in Figure 17 to illustrate the operative position of the intermediate cup holding fingers.

Figure 23 is an enlarged detail of one of the intermediate cup retaining fingers shown in the construction of Figure 17.

Figure 24 is an enlarged cross sectional view of the milk delivery portion of the apparatus including the mechanism supported on the front door of the apparatus to illustrate in more detail the arrangement and relative position of the cup delivery mechanism, the milk delivery mechanism, the weighing and measuring mechanism, and the milk delivery door opening mechanism.

Figure 25 is a sectional view of the construction shown in Figure 24 to show in more detail the operation of the milk delivery portion of the apparatus.

Figure 28 is a cross sectional view of the construction shown in Figure 8 along the line 28—28.

Figure 29 is a cross sectional view of the construction shown in Figure 8 along the line 29—29.

Figure 30 is an enlarged detailed view of the clutch arrangement on the door lifting mechanism.

Figure 31 is an enlarged detailed view corresponding to Figure 30 and partially in section showing the clutch arrangement in engaged condition.

Figure 32 is a cross sectional view in plan of the construction shown in Figures 1 and 2 with the top cover portion removed.

Figure 33 is an enlarged diagrammatic view in perspective of the weighing table, cup holder, and pivotally mounted cup retaining fingers.

Figure 34 is a side view of the cup holder construction shown in Figure 33 to illustrate the position in mounting of the pivotal cup retaining fingers in more detail.

Figure 35 is an enlarged vertical sectional view of a portion of the door of the apparatus illustrating in more detail the front door locking mechanism.

Figure 36 is an enlarged detailed view in section of the construction shown in Figure 35 along the line 36—36 to show the door knob and lock in more detail.

Figure 37 is a diagrammatic view in perspective of the lower portion of the milk supply container to show the valve cover plate locking means.

Figure 38 is a diagrammatic view corresponding in location to Figure 37 showing the valve cover door in operative condition.

Figure 39 is a diagram of the electronic circuit controlling the operational sequence of the apparatus.

Figure 7:
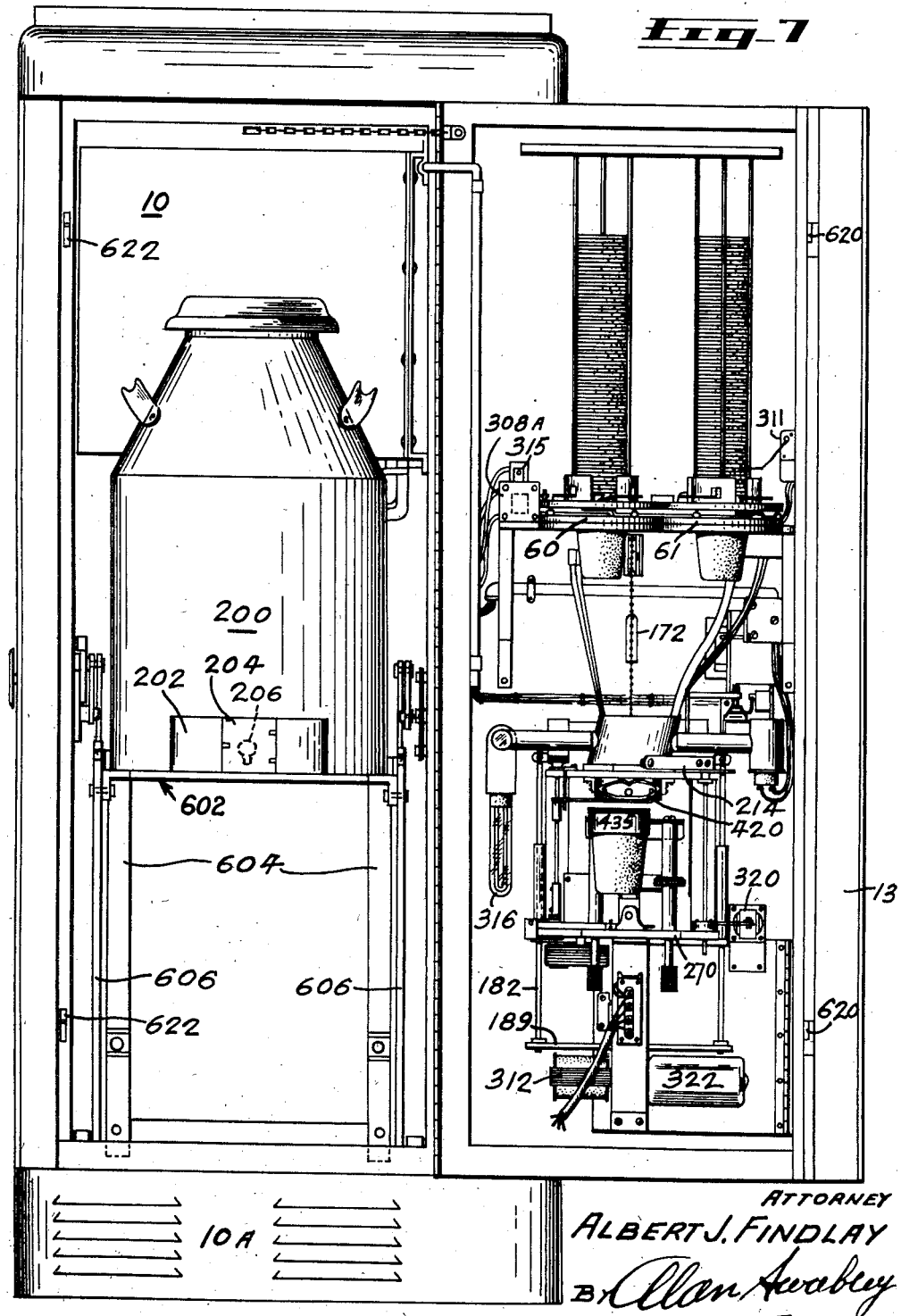
Figure 7 is a front view of the cabinet construction shown in Figures 1 and 2 with main front door in open position to illustrate in more detail the internal arrangement and construction.
Figure 26:
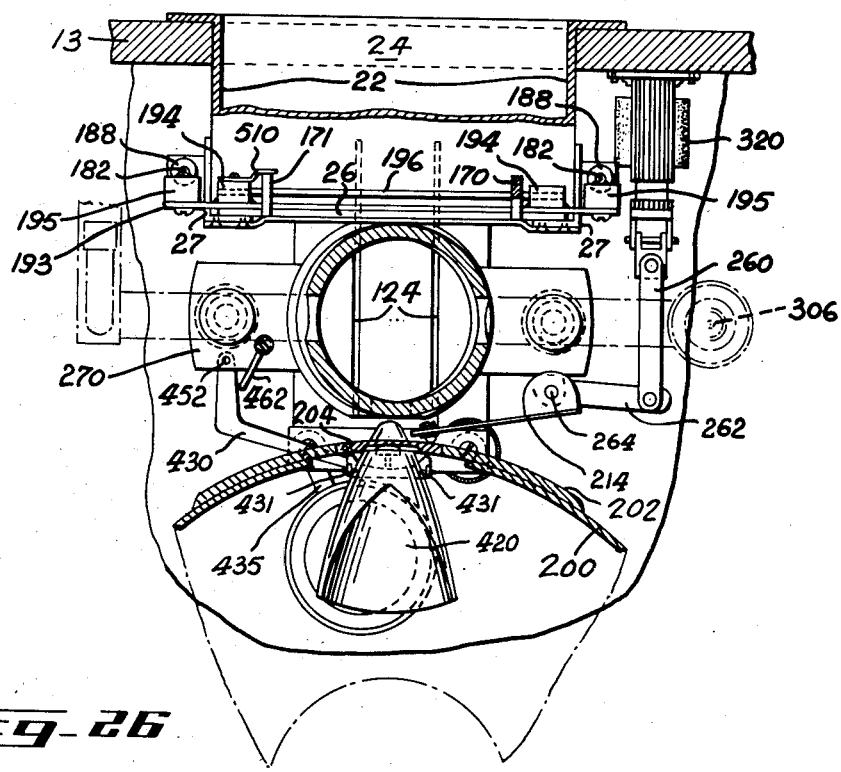
Figure 26 is a cross sectional view of the apparatus shown in Figure 8 along the lines 26—26 to illustrate in more detail and in plan the position and relationship of the elements of the milk delivery mechanism including a segment of the milk supply container.
Figure 27:
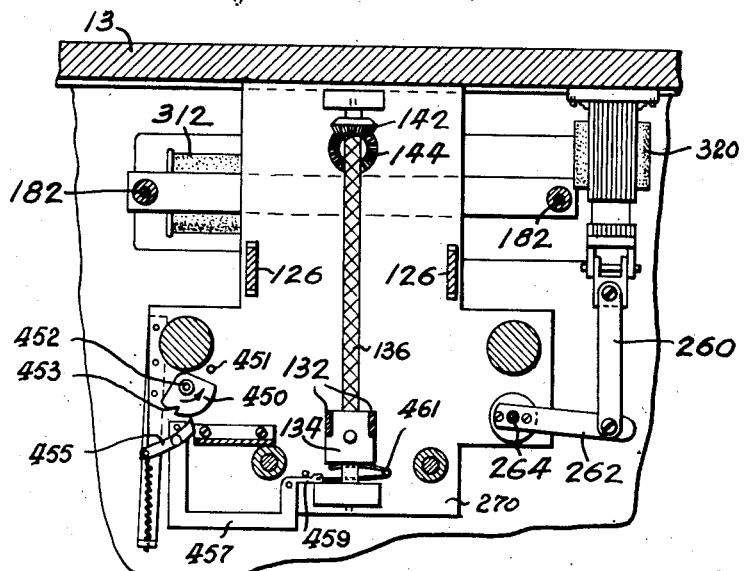
Figure 27 is a cross sectional view of the construction shown in Figure 8 along the line 27—27.

With particular reference to the accompanying drawings Figures 1 and 2 show the exterior cabinet or housing as seen from the front and right side and the front and left side respectively.

Dealing first of all with the external appearance of the cabinet 10, the front includes a recessed panel 12 wherein there is provided an indicating light 310, a coin receiving slot 16, and a waste cup receiving opening 18. A push button 21 is provided alongside of the coin receiving slot 16 for the purpose of clearing the machine if a slug or washer has been inserted in the coin slot. The opening 18 is for the depositing of waste or empty cups and there is a receptacle provided inside of the cabinet 10 to receive these cups when they are put through the opening as will be described in more detail later.

A main door 13 is hinged along one edge of the recess 12, as indicated at 20, and there is a cup dispensing opening 22 provided in the door 13 which includes a shelf 24 wherein the filled cup or container is deposited. The rear portion of the opening 22 is masked by a sliding door 26, which is provided with a transparent panel 28 and is automatically raised and lowered during the operation of the machine. The construction and function of these elements will be described in more detail later.

General operation

On depositing a coin in the machine through the coin slot 16 it first passes through a coin weighing and selection device. The first action of the coin as it goes down through the selector is to actuate a light source within the apparatus which places a light beam across the apparatus to a photoelectric cell which is a controlling feature as will be described later.

If the coin is defective, that is to say is of the wrong size, weight or consistency, it is rejected by the coin weighing and selection device which also includes means whereby if during the course of operation of the machine something goes wrong with the dispensing mechanism, or if a second coin is deposited too soon after the first coin the coins are rejected.

If the coin is good and has passed through the first stages of the coin selector, a cup is dispensed to a weighing and metering portion of the apparatus and the coin is allowed to travel onwards and trip a switch actuating the milk supply valve release mechanism. There are several other safety factors in combination with the coin selector mechanism which will be described more fully when specific reference is made to the internal mechanism of the apparatus.

In connection with the cup dispensing portion of the apparatus the cup passes down through a guide chute where it is dropped to milk receiving position on the weighing table. Assuming that all of the conditions are in order, the dropping of the cup to the weighing table has broken a beam of light to the photoelectric cell and therefore has set in operation the valve releasing mechanism. The valve releasing mechanism acts to depress the valve on the milk supply container and thus a stream of milk is poured into the cup until sufficient weight has been added to the cup to actuate the weighing table.

Once sufficient milk has been delivered to the cup, the weighing table tilts and thus actuates a cup advancing mechanism. The cup advancing mechanism moves the filled cup towards the front of the machine and simultaneously actuates special mechanism which immediately raises the door 26 so that the filled cup is deposited on the shelf 24 of the door opening 22. The door 26 is closed behind the filled container so that it is impossible for anyone to touch any portion of the apparatus inside of the housing 10.

In order that the various operative portions of the apparatus may be more clearly understood they will now be described individually and in detail.

Coin selecting mechanism

With particular reference to Figures 5 and 6 of the drawings and also Figures 10, 11 and 12, on depositing a coin in the coin slot 16, it first passes through a coin weighing and selector device 40 which is of conventional type of coin selector with some additional features being added which make it special for the present use. The first action of the coin as it goes down the selectors chute is to contact a switch 303 which controls a light source so as to place a beam of light across the apparatus to the photoelectric cell 306 which is a controlling feature as will be described later.

If the coin is no good, that is to say, if it is of the wrong size, weight or consistency, it is rejected by coming into contact with a pin 44 which projects outwardly in the path of the coin. This pin is in turn is controlled by a magnet 302 which is a safety feature in the present construction so that if during the course of operation of the machine something goes wrong with any of the dispensing mechanism or, if a second coin is deposited too soon after a first coin, the pin is retained in position and so a subsequent coin is rejected. The magnet 302 is energised by the master control circuit if any of several parts fail to operate as required.

The further descent of the coin in the coin selector brings it into a position where it contacts a second switch 305 which controls the actuation of the cup selecting mechanism and when so actuated releases a cup. This switch 305 is also connected to the photoelectric cell set-up of the cup selection portion of the apparatus so that if a cup does not pass the photoelectric cell the coin is retained and the switch for the valve is not operated.

If the coin is good and has passed through the first stages of the selector and a cup is dispensed, the coin is allowed to travel onwards and trip the switch 307 actuating the valve release mechanism.

There are several other safety factors employed in combination with the coin selector mechanism which will be defined in more detail when reference is made to the circuit diagrams showing the overall controlling circuit.

Cup selecting and dispensing mechanism

With reference to the actual operation of the machine, assuming that the coin has passed through the selector, that is the initial stage, it will have actuated a push pull solenoid having opposed solenoids 308a, 308b, operating the cup dispensing mechanism so that a cup is dropped down a guiding chute onto the weighing table in position for receiving milk from the supply container.

The solenoids 308a, 308b act on opposite ends of a plunger 50 which is centrally insulated so as to move between one of two alternative positions and selectively in either direction to contact adjustable screws 51a, 51b. In other words, if for example, the solenoid plunger 50 is moved towards solenoid 308a when solenoid 308b is energised the plunger will travel towards the solenoid 308b and at the same time a double ended switch 315 mounted on the moving solenoid plunger is tripped by one of the switch buttons contacting the screw 51b so that on the next actuation the movement will be from solenoid 308b to solenoid 308a and so on.

The cup selecting and dispensing arrangement consists essentially of a pair of coupled annular cup supporting members 60, 61, which are each provided with a set of overlaid movable fingers 70, 90 which are actuated in sequence by the partial rotation of the annular top plates 96, 97, through the oscillating movement of the plunger 50. This movement is accomplished by a projecting member 63 which extends from the plunger 50 of the solenoid and is disposed so as to contact, on either side, a pin 65 extending upwardly from the upper surface of the top plate 96 of the member 60 so that the movement of the member 63 in one direction bears against the pin 65 and causes a partial rotation of the annular top plate 96 in one direction and by reason of a pair of toothed gear segments 67, 68, in meshed engagement centrally of the opposed annular members 60, 61, causes a partial counter rotation of the annular top plate 97 of the other member 61. The segment 67 is secured to the top plate 96 and the segment 68 is secured to the top plate 97.

The movable selector fingers 70, 90 are adapted to move inwards and outwards towards the centre of each annular member 60, 61, and so retain in sequence the beaded rim of one of a stack of cups supported in each of the annular members 60, 61. The main or bottom fingers 70, of which there are three to each ring disposed in circumferentially spaced apart overlapping alignment, are formed so as to have a first lower portion 72 which bears directly against the upper surfaces 74 of ring support members 76 and a stepped upper portion 78 which is integral with but extends above the first portion 72. Each of these fingers 70 are mounted on the supports 76 so as to pivot about a central supporting pin 80 so that under actuation by the partial rotational movement of the annular members top plates 96, 97, either the first portion 72 or the second portion 78 is projected inwardly of the inner periphery of the particular annular member 60, 61 concerned.

The first or lower portion 72 of each finger 70 comes into action in the initial movement of the selector fingers. With reference to Figure 18 of the drawings, on the initial movement these finger portions 72 come in and support the entire stack of cups by engaging the beaded edge of the lowermost cup.

The inward and outward movement of the double ended fingers 70 is accomplished by projecting pins 106 which are engaged in cam shaped slots 108 provided in the annular top plates 96, 97 of each member so that as the plates 96, 97, are partially rotated, the bottom portion 72 of the fingers 70 moves out and on the counter rotation the top portion 78 of the finger 70 moves out and the bottom portion 72 moves in and so on.

In the second movement of the cup selecting and dispensing fingers three intermediate fingers 90, which are mounted on each annular member 60, 61 above the first portion of the double ended finger 70, come into operation.

These intermediate fingers 90 are pivotally mounted at one end by a pin 92 so as to be also capable of moving in or out relative to the inner circumference of the annular members 60, 61. The swinging motion of the intermediate fingers 90 is caused by the engagement of a pin 94 which protrudes downwardly from the annular top plates 96, 97, on each annular member 60, 61, which is the portion that is actually moved by the movement of the solenoid plunger 50.

On the partial rotation of either of the annular top plates 96, 97, the first portion 72 of the double ended fingers 70 is withdrawn, as previously described, and the intermediate fingers 90 are interposed so that the rim of the bottom cup is no longer supported. However, the rim of the next cup is now supported on the intermediate fingers 90 so that the weight of the stack of cups is carried by the fingers 90.

On the third operational movement of the cup dispensing arrangement, as the annular top plates 96, 97, continue to rotate, while the intermediate fingers 90 are still in position the second portion 78 of the double ended fingers 70 comes into position beneath the intermediate fingers 90 so that as they are withdrawn by the continued rotation of the annular top plates 96, 97, the cups are supported on the second portions 78 of the fingers 70. Each of the portions 78 of the fingers 70 are provided with a dividing slot 79 and directly beneath this slot there is mounted a thin resilient strip 100 which extends coextensively with the projecting fingers.

As the last step in the dispensing of a cup, there are further projecting spring strips 102 which are secured to the stationary cylindrical cup holders 99, 101, and are adapted to come into engagement with cams 103 mounted on the annular top plates 96, 97, so that as each top plate rotates, a dependent portion of the spring strips 102 is forced down through the slot 79 of the cup finger portions 78 so as to depress the spring strips 100 beneath the fingers and eject the lowermost cup from the stack, see Figure 20.

It has been found that while the cups are supported in the intermediate condition that even though there is no physical support beneath their rims they will not drop from the stacks as the weight of the additional cups extends the side walls of the unreleased cups and holds them firmly in position until the bottom cup is pushed downwards by the spring action referred to.

It should be explained that each partial rotation of the annular top plates 96, 97 of the members 60, 61 does not result in a complete dispensing of a cup but only a portion of the step sequence described so that when a cup is dispensed from one annular member 60 for example, the cups of the other annular member 61 are in a ready position so that the next movement of the annular member 60 will cause a cup to be dispensed from the opposite stack and so on.

Cup delivery

As a cup is dropped from the bottom of the cup dispensing device, it passes down through the offset guiding chute 110 where it is dropped in milk receiving position on the weighing table 112. In order to avoid an empty cup from bouncing or becoming dislodged prior to the pouring of the milk there are provided spring biased offset fingers which keep the cup firmly in place until it is advanced. With particular reference to Figures 33 and 34 of the drawings the cup retaining means include a stationary cup holder 250 which is provided with an upstanding semi-circular wall 252. The spring biased offset cup retaining fingers 254 referred to above are of elongated conical form and eccentrically mounted for pivotal movement to the weighing table 112 by pins 256. These fingers are resiliently biased so as to extend across the front of the cup holder wall 252 by springs 258 which contact a cut out portion 253 in each of the fingers 254. With this arrangement when an empty cup is dropped into the cup holder 250 the fingers 254 prevent it from bouncing or moving. The resilient springs 258 and the eccentric mounting allow the fingers 254 to swing outwards when engaged by a filled cup as it is advanced from the cup holder. The valve releasing mechanism, weighing table, and associated mechanism and the advancing mechanism for moving the filled cup will now be described in more detail.

Weighing table and cup advancing mechanism

Assuming that all other conditions are in order, the dropping of the cup to the weighing table 112 has broken the beam to the photoelectric cell 306 and through the associated controls will prepare the operation for the valve releasing mechanism adapted to deliver milk from the supply tank. The breaking of the beam to the photoelectric cell has, through circuits which will be described in detail later, actuated a solenoid 320 which is mounted on the inner face of the main door of the cabinet enclosure. The solenoid 320 is pivotally connected by means of a link arm 260 to a lever arm 262 connected to a shaft 264. The shaft 264 is mounted for pivotal movement on a transverse lower supporting plate 270 so as to extend upwardly therefrom and a valve release arm 214 is mounted on the upper end of the shaft 264. With this arrangement, actuation of the solenoid 320, through the link arm 260, and the lever arm 262 pivots the shaft 264 and urges the valve release arm 214 outwardly. The motion of the arm 214 acts to depress the valve on the supply tank and thus a stream of milk is poured into the cup until sufficient weight has been added to the cup to depress the table 112.

Once sufficient milk has been delivered to the cup, the weighing table 112 tilts and thus actuates a switch 309 controlling the cup advancing mechanism, and simultaneously releases the relay controlling circuits. The supporting table 112 is slotted as indicated in 124 and is pivotally mounted between a pair of standards 126 extending from the plate 270 in spaced apart relationship. A pair of cup advancing fingers 132 protrude through the slots 124 of the table 112 and through corresponding slots provided in the cup holder 250 so as to engage the rear lower margin of the cup and push it along the table 112 towards the door opening 22 in the main door 13. The slots 124 carry onto front shelf 24 of the door opening 22 so that the fingers 132 push the filled cup out through the door opening and onto the shelf 24. The cup advancing fingers 132 are mounted on a follower block 134 which is mounted for sliding movement on a double threaded helical screw 136 which extends from adjacent the rear of the machine to the front of the machine. The block 134 is engaged for movement with the screw 136 by means of a follower pin 138 so that at the end of the advancing motion the block 134 is returned to its original position.

In the present construction the double threaded helical screw 136 which advances the cup fingers supporting block 134 is also connected to a further helical shaft 140 which provides the motive power to the door raising mechanism. This is accomplished by a pair of bevel gears 142, 144 with the gear 142 being connected to the shaft 136 advancing the cup fingers with the other gear 144 being connected to the second double helical shaft 140 which extends at right angles to and beneath the cup advancing shaft. The second helical screw 140 is driven by a motor 322 through a slip transmission. The slip transmission referred to between the motor 322 and the lower double helical shaft 140 is shown in section as being in engaged position in Figure 31 and disengaged position in Figure 30. This transmission consists essentially of a solenoid operated worm 160 having a slotted end 161 which is adapted to engage with pins 165 extending from the end of the shaft 162 of the motor 322. This worm 160 is in meshed engagement with a worm gear 163 connected at the lower end of the helical shaft 140 so that when the solenoid 312 is not energized, there is no transmission of the drive of the motor 322. When the solenoid 312 through the switch 309 is energized it forces the worm 160 towards the motor 150 causing the slotted end 161 and the shaft end 162 to meet and thus insuring a drive from the motor 150 to the helical shaft 140. On de-energizing of the solenoid 312, the helical formation of the worm 160 due to its engagement with the worm gear 163 causes it to unscrew or come away from the motor shaft end 162 so that the transmission is disconnected.

Door raising mechanism

As the cup advancing mechanism carries the cup moving fingers 132 along the slots 124 towards the front door opening 22 of the casing 10 it is necessary that the door 26 be caused to raise suddenly to avoid the cup engaging with the door and tilting. The door 26 is mounted for sliding movement relative to the door opening 22 between a pair of guiding angles 27 attached to the side walls of the door portion framing the door opening 22. A pair of cylindrical guiding members 188 are mounted on each side of the door opening frame so as to vertically support and guide a pair of supporting shafts 182 slidably mounted therein. The lower ends of the rods 182 are connected in spaced apart relationship to a transverse bar 189 on which there is mounted a follower block 180. The follower block 180 is disposed centrally of the transverse bar 189 and includes a central opening so that it is mounted for sliding movement over the lower helical shaft 140. The carrier block 180 is provided with a follower pin 191 engaged in the threads of the shaft 140 so that rotation of the shaft carries the block 180 in a reciprocal motion up and down the threaded portion of the shaft 140.

The upper ends of the rods 182 are connected to an upper transverse plate 193 by blocks 195. The plate 193 extends across the upper ends of the door guide 27 and a pair of supporting blocks 194 are also secured to the plate 193 in spaced apart relationship from the blocks 195. A supporting shaft 196 is journalled between the blocks 194 so as to extend transversely across the upper portion of the door opening 22 in alignment with the plate 193. The shaft 196 serves as a support and pivotal axes for a pair of spaced apart catch members 170, 171 having their lower ends rigidly connected thereto. Both the catch members 170, 171 include a notch adapted to engage the upper edge of the door 26 with the member 170 being considerably longer than the member 171. A contact shaft 502 is mounted on the upper end of the catch member 170 and extends transversely therefrom so as to engage a pivotally mounted cam plate 504 as the catch members 170, 171 rise.

The cam plate 504 is mounted for pivotal movement to a supporting bracket 505 and is shaped so that as the contact shaft 502 rises and engages the end of the cam plate 504 it is urged outwardly towards the inner surface of the door 13. The cam 504 is prevented from swinging in the opposite direction by a stop pin 506 supported on the bracket 505 so that the contact shaft 502 can travel completely around the cam plate 504.

The catch members 170, 171 are normally spring biased towards the door 26 by a spring 510 so that the shaft 502 tends to follow the cam plate 504 during its upward and downward movement.

Consequently the first movement or opening movement of the door is a release of the catch members 170, 171 by the tipping of these members outwardly so that the door 26 is carried upwards quickly along the guide angles 27 by a counterweight 172 through a flexible chain 174.

The continued rotation of the shaft 140 carries the contact shaft 502 upwards along the cam plate 504 until it passes over the top of the cam plate. Once the shaft 502 has passed over the top of the cam plate 504 the influence of the spring 510 rocks the catch members 170, 171 back towards the door 26. The continued rising of the catch members 170, 171 clears them over the top of the door so that they clip over the top of the door and as the carrier block 180 reverses its travel at the end of the helical thread on the shaft 140 and descends, the door 26 is also carried downwards. As the contact shaft 502 descends it passes on the inner side of the cam plate 504 which, by reason of its pivotal mounting, swings to one side and allows the contact shaft to continue its downward travel in alignment with the door until the door is completely closed in its original position.

A safety feature is provided in connection with the door 26 and its associated mechanism in the form of a door lock magnet 314 when in normal condition interposes a pin 317 in the path of the door contact shaft 502, and when energized withdraws the pin 317 so that the shaft 502 is free to proceed as described. This is to prevent anyone from attempting to lever the door 26 upwards before the machine is in operation.

Milk supply container

In connection with the milk supply tank and the associated release valve it was found that certain modifications had to be made to the milk supply container itself to avoid any possibility of the dispensing valve to be depressed during delivery and installation. Accordingly, the present apparatus embodies the use of a milk supply container having a special valve guard door as shown in Figure 37. In this construction, the supply container 200 is provided with a supplementary flange 202, a center segment 204 which, directly in front of and in alignment with the release valve 206, is hinged as indicated at 208. The unhinged side of the door 204 is adapted to be locked in position by the insertion of a pin 210 which fits through an opening provided along the marginal edge of the door 204 and which engages a complementary catch portion 212 provided on the other segment of the shielding portion 202. With this construction, when the supply container 200 is in position within the apparatus, and the pin 210 withdrawn, the depression of the valve 206 is caused through deflection of the door portion 204 under the action of the valve release arm 214.

In order to avoid sudden or excess pressure by the action of the valve releasing member 214 against the container door 204, the member 214 is made of resilient material, for example resilient steel or phosphor bronze, which flexes when the pressure is placed on the door 204 in order to maintain a constant tension on the release valve until sufficient milk has been delivered to the cup. In connection with the valve actuating and releasing mechanism there is also provided a pouring spout 420 which is moved into alignment with the cup prior to the opening of the valve 206. This pouring spout 420 engages the bottom portion of the cup guiding mechanism on being advanced into pouring position, and is pivotally mounted on a swing arm 430 supported on a shaft 452 mounted on and extending upwardly from the support plate 270 so that this engagement tilts up the pouring spout to an acute angle thus insuring a good flow of milk by gravity. On release the pouring spout 420, which is pivotally mounted between a pair of standards 431 extending from the arm 430, tilts back in the opposite direction so that in the event of any dregs or drippings of milk which have not gone into the cup are dripped in the opposite direction into a paper cup held in the support 435 mounted on the vertical standard 436.

In connection with the withdrawal of the pouring spout 420 an additional safety feature is incorporated which comprises essentially of a catch 450 mounted on the spout advancing shaft 452 and controlled by the forward movement of the cup advancing mechanism. The pouring spout supporting arm 430 is mounted on the shaft 452 which is moved into operative position through a rotary magnet 324 and is returned to inoperative position through the action of a spring 462 acting on the supporting arm 430. The rotary magnet 324 is energized simultaneously with the valve 320.

The arrangement of the catch 450 is such that it comes into operation so that the pouring spout 420 is not retracted until the cup has started to advance towards the dispensing window 26. This delay is to insure that any drip in the lower portion of the spout 420 will be delivered to the cup before the pouring spout 420 is moved.

The catch 450 is connected directly to the shaft 452 and is provided with an indentation or notch 453. This notch 453 is adapted to be engaged by a pivotally mounted resiliently biased pawl 455 which is mounted on a substantially L shaped swing arm 457 mounted for pivotal movement to a portion of the supporting frame plate 270 beneath the double helical threaded shaft 136. The arm 457 is provided with an extension 459 which is connected to a spring 461 which is disposed directly in the path of the cup moving block 134. As the block 134 moves to the furthest rear position the spring member 461 is compressed and the arm 457 is pivoted bringing the pawl 455 into engagement with the notch 453 in the catch 450 as the catch 450 is rotated in a counter clockwise direction by the magnet 324. The catch 450 cannot proceed beyond a certain distance, that is its rotation is limited as it engages a stop 451. This means that the catch 450 is held against further rotation under the influence of the rotary magnet 324, which continues to operate, until the cup finger block 134 advances towards the front of the machine. By the engagement of the pawl 455 with the notch 453 in the catch 450, the catch 450 is not counter rotated to its original position until the block 134 has advanced sufficiently to release all tension from the spring 461. This delay gives the effect desired in that the spout is not tilted rearwardly immediately after the valve 206 has been released so that any drip of the milk in the lower portion of the spout 420 will be delivered to the cup before the pouring spout 420 is moved.

In the preferred construction illustrated there is provided special means for the loading and unloading of the milk supply containers within the cabinet enclosure 10. With particular reference to Figures 7 and 9, there is provided in the cabinet enclosure directly behind the main door 13, a supporting table 602 the rear edge of which is provided with rollers 603 which are supported by and are adapted to ride on a pair of spaced apart curved guide members 604 which extend from the base portion of the cabinet enclosure upwards and inwards towards the back wall. The front portion of the supporting table 602 is pivotally connected to and supported by a pair of spaced apart lifting arms 606 the lower ends of which are pivotally connected to base blocks 608. The upper ends of the arms 606 curve outwardly and are provided with notches 609 which are adapted to be engaged with a lifting handle. In order that the supporting table 602 remains horizontal as it travels down the guide members 604 there are provided guiding link arms 610, 611 at each side of the table. The links 610 are pivotally connected at one end to each side of the table 602 adjacent the front edge with the other ends pivotally connected to the links 611. The other ends of the links 611 are pivotally connected to the sides of the cabinet enclosure by bearing plates 612 secured thereto at each end.

With this arrangement, when it is desired to load a full container in the machine the arms 606 are lowered, the container placed on the table 602 and by means of the lifting handle, the arms 606 are raised so that the table 602, guided by the members 604, rises into position within the enclosure. The pivotal axes of the arms 606 are arranged so that when the table is in correct position the upper ends of the arms 606 have passed over center so that they will remain in this position under the load of the table 602. As a further safety feature, the terminal portions of the guide members 604 are provided with indentations which prevent the rollers 603 from moving out once they have moved past the indentations to their terminal position. When the container is empty, the rollers 603 will rise easily over the indentations allowing the table to descend under the influence of the arms 606.

*Electrical circuit*

In order that the sequence and operation of the various elements described which operate by the energization or de-energization of magnets or solenoids or by the closing or opening of various switches as described in conjunction with the mechanism the overall controlling circuit will now be described in detail and with reference to the circuit diagram shown in Figure 39.

Upon the insertion of a coin, the switch 303 is closed thereby operating a photoelectric cell light source via line 1, to contact springs of switch 303, to contact springs of switch 301, to coil on C relay, from coil C relay to the closed contact of scale switch 309 to line 2, therefore establishing an initial circuit closing line to relay C.

Upon operation of relay C the contact C–1 is operated providing a locking circuit to bridge over the initial coin contact of switch 303 holding this circuit closed during the operating cycle. The locking circuit is via line 1 to contact springs C–1 of relay C, to coil of relay C, to the closed contact of sale switch 309 to line 2.

Simultaneously with the closing of the C relay a parallel line from the coil of the relay is connected to the photoelectric light source 304 via line 1, C–1 contacts to binding post of light source socket 304, to the closed contact of switch 309 to line 2. This circuit now completes a light beam that is associated with the photoelectric cell 306 disposed in the path of the falling cup. The coin having operated contact 303 it passes through the conventional type of coin rejecting unit to switch 305. Assuming that the coin is acceptable it will pass the rejector device and subsequently close the switch 305 thereby providing a circuit to the cup dispensing unit via line 2, contact springs of switch 305 to the closed position of cup selecting switch 315, to the closed contacts of B–2, to coil A, and line 1.

Upon operation of relay A contacts A–1, A–2 and A–3 will be operated. Contact A–1 provides a locking circuit to bridge over the initial contact of switch 305 via line 1 to coil of A relay, to contacts A–1, to the closed contact of switch 309 to line 2.

Upon operation of the contact A–3 the cup solenoid 308A will now be operated, via line 1, contacts 3A, to cup solenoid 308A, to line 2 thereby operating the plunger of 308 solenoid upon which is fixed the cup selector switch 315, and through the medium of the adjustable screws 51a, 51b, thereby preparing the circuit for the operation of relay B which will operate subsequently to the depositing of another coin on the next use of the machine.

Upon the insertion of another coin relay B will be operated causing the cup solenoid 308 to again operate in the opposite direction than that when operated by relay A. The circuit will now be as follows, from line 2 to contacts of switch 305, to cup selector switch 315, to contacts A–2 of relay A, to coil of relay B, then to line 1. This will establish the initial circuit as described previously for relay A. The locking circuit is now, via line 1, to coil of relay B, to contacts B–1, to the closed contact of switch 309, to line 2. Upon the operation of relay B the cup solenoid 308B will be operated, via line 1, B–3 to cup solenoid 308B, to line 2. The operation of either of the cup solenoids 308A or 308B will dispense a cup from the magazine to the cup weighing table through the cup guiding chute.

The operations previously described permits the A and B relays to work alternatively for the purpose of equally dispensing the cups from the cup magazines.

The switch 309 is normally closed but during the cycle, switch 309 is broken thereby releasing relay A to normal position ready to receive another coin.

The passage of the cup from the magazine through the cup guiding chute to the weighing table 112 passes the photoelectric cell light source 304 thereby breaking the light beam.

Relay K is normally energized from the rectifier tube of the amplifying circuit shown, which is the conventional type of photoelectric circuit. The breaking of the beam to the photo cell 306 will momentarily release relay K thereby closing the contact K–1 which will provide a holding circuit for relay E, via line 1, to contacts C–2, to coil of relay E, to contacts K–1, to line 2 thereby closing relay E.

With the operation of relay E the circuit will now be, via line 1, contact C–2, coil of E relay, to E–1 contact, to line 2. Upon operation of relay E the coin release coil 318 will now be operated, via line 2, to contacts of E–1, to coil release coil 318, to contacts C–2 to line 1.

Upon operation of coin release coil 318, which is directly related to the passage of the cup past the light beam, the release coil 318 will permit the coin to leave the coin rejector unit and pass down the coin chute to the contacts 307 which control the electrically operated valve 320 via the initial operation of contact 307, from line 1, contacts of 307, to coil of relay D, from coil of relay D, to the closed contact of switch 309, to line 2. This provides an initial operating circuit for relay D. A holding circuit is now provided via line 1, to contacts D–1, to coil of relay D, to the closed contact of 309, to line 2.

With the closing of relay D a circuit is now provided to the valve 320, via line 1, contacts D–1, to valve solenoid 320, to line 2. This operation permits the flow of liquid into the cup which is now resting on the weighing table 112. At the same time the pouring spout rotary magnet 324 is energized as it is connected in parallel with the valve solenoid 320.

When a pre-determined quantity of liquid has been delivered the weight tilts the table 112 and depresses the normally closed contact of switch 309, and closes the normally open contact. By reason of the contact of the switch 309 being depressed from the normal closed position it is now open, and the normally open contact is now closed. This operation breaks the holding circuits as previously described for relays A, B, C and D restoring them to their normal condition.

When switch 309 is operated to the lower contact a circuit will now be provided to operate the cup delivery. Upon operation of switch 309 to the lower contact a circuit will now be provided to the driving motor 322, the clutch solenoid 312 and the door lock magnet 314. This circuit will then engage the clutch with the motor and electrically release the door lock latch magnet 314 via line 2, to the lower contact of switch 309, to the terminals of motor 322, clutch 312, door lock 314, and returning to line 1. The energizing of the motor 322 drives the helical shaft 140, thereby raising the follower block 180 to which is associated the normal open contact of motor drive switch 313. The lower contact of 309 is parallel with switch 313. Switch 309 provides the initial starting circuit thereby advancing the follower block 180 and releasing the contact spring of switch 313, thereby providing a closed circuit to the motor 322 via line 2, contacts of 313, to motor 322, clutch 312, door 314, to line 1.

The helical shaft 140 having both right and left hand threads the follower block 180 reverses at the end of the helix thereby returning the following block 180 to its normal position and opening the contacts of switch 313.

During the advancing of the cup from the weighing table the pressure will now be relieved from the contact spring of switch 309 thereby re-establishing it to its normally closed position on the upper contacts.

Upon the insertion of the coin to operate the first coin contact switch 303 which is wired in series with 301, this being the circuit controlling the operation of relay C. In the event that a coin is inserted during the cycle between the depositing of the first coin and the delivery of the cup any subsequent coin will now be rejected and open up the controlling circuit for relay C to prevent the light source from operating during the delivery of the cup. The rejector circuit is operated via line 1, to contact of relay E–2 to contact D–2, and relay D, to the reject coil 302, to the normally closed contact of sold-out switch 311, to line 2.

Normally the reject circuit is energized and in position to receive coins; upon operation of relay E from the photoelectric cell circuit and the operation of relay D of the valve circuit. This would then de-energize the rejector coil 302 rejecting all coins that may be inserted while the machine is in operation.

Provision is made by means of switch 311 to indicate that all cups have been used in the cup magazines thereby providing a switch to open up the rejector circuit which is in series with the rejector coil D–2 contact, and E–2 contact, thereby rejecting all coins when the cup magazine is empty.

The weight of the cups in the cup magazine keeps a constant pressure on the contact spring of switch 311 maintaining a closed circuit for the reject coil 302. As soon as pressure is relieved from the contact spring of switch 311, by the depletion of the cups, the contact is transferred from the reject circuit to the sold-out signal lamp 310, via line 1, sold-out lamp 310, to upper contact of switch 311, to line 2, upon operation of relay C. A circuit is provided to operate the numerical counter 318, via line 1, contact C–2, coil of counter 318, to line 2.

Provision is made for the constant activation of a germicidal lamp 316 which is permanently energized when the machine is connected to an electric source for bacteriological and germicidal purposes.

*General construction*

As previously described, the cabinet enclosure 10 is provided with a main door 13 on which most of the operating mechanism is mounted. This door is provided with a locking arrangement as shown in Figure 35, and in section in Figure 36.

The front edge of the door 13 is provided with spaced apart slots 620 which are adapted to receive catch arms 622. The catch arms 622 are pivotally mounted to each end of an elongated locking bar 624 positioned adjacent the door jamb of the cabinet enclosure 10. The locking bar 624 is supported by the engagement of a lever pin 625 in a centrally disposed bracket 626 secured to the bar 624. The lever pin 625 is secured to the inner face of an opening knob 628 mounted on the side wall of the cabinet enclosure so that rotation of the knob 628 clears the catch arms 622 from engagement with the slots 620.

In order to prevent unauthorized opening of the door the knob 628 is prevented from rotation by the engagement of the end of the lever pin 625 remote from the locking bar 624 by a retaining angle 630 which is connected to and controlled by the turning of a tumbler lock 632 also mounted to the side wall of the enclosure. In order to turn the knob 628, the lock 632 must be first rotated to clear the angle 630 from the end of the pin 625. The relative position of these parts are also shown in plan in Figure 32.

The overall construction of the cabinet enclosure 10 is of a conventional nature with insulated walls and the required refrigeration unit mounted on the lower portion 10A of the cabinet having a lowered front portion.

The interior of the enclosure is divided with the main compartment 640 housing the mechanism described and the smaller compartment 642 housing the main control panel 643 and essential wiring together with the coin selector mechanism and used cup container 650 which is removable and is disposed directly beneath the cup disposal opening 18. The compartment 642 is provided with a door 645 hinged to the cabinet enclosure as indicated at 646.

I claim:

1. A liquid dispensing apparatus, comprising in combination, a housing, said housing including a dispensing opening, a support assembly within the housing carrying a number of cups in stacked relationship, releasing means for releasing the cups one at a time, the released cup being adapted to pass along a predetermined path to liquid receiving position, first control means actuated by the passage of said cup through a portion of said path, a liquid container having an outlet, a dispensing valve controlling said outlet, means responsive to said first control means adapted to open said dispensing valve, metering means responsive to the quantity of said liquid in said cup, said first control means being also connected with and responsive to said metering means, whereby said dispensing valve is closed through said control means and metering means when the cup is filled to a predetermined amount, cup advancing means adapted for movement from liquid receiving position to a forward access position, said cup advancing means also being connected with and responsive to said metering means, whereby when a cup receives a predetermined amount of liquid said cup advancing means is actuated.

2. A liquid dispensing apparatus, comprising in combination, a housing, said housing including a dispensing opening, a support assembly within the housing carrying a number of cups in stacked relationship, releasing means for releasing the cups one at a time, guiding means for guiding the released cup from said supporting means along a predetermined path into liquid receiving position, first control means actuated by the passage of said cup through a portion of said path, a liquid container having an outlet, a dispensing valve controlling said outlet, means responsive to said first control means adapted to open said dispensing valve, means for retaining said cup in liquid receiving position while the liquid is being delivered from said valve, metering responsive to the quantity of liquid in said cup, said first control means being also connected with and responsive to said metering means whereby the valve is closed when the cup is filled to a predetermined amount, cup advancing means positioned beneath said cup retaining means and being adapted for movement from adjacent said cup retaining means to a forward access position, said cup advancing means also being connected with and responsive to said metering means, whereby when a cup receives a predetermined amount of liquid said cup advancing means is actuated.

3. A liquid dispensing apparatus, comprising in combination, a housing including a dispensing opening, a cup dispensing assembly within the housing carrying a number of cups in stacked relationship, releasing means for releasing the cups one at a time, guiding means for guiding the released cup from said cup dispensing assembly along a predetermined path into liquid receiving position, first control means actuated by the passage of said cup through a portion of said path, a liquid container having a dispensing valve, valve opening means responsive to said first control means adapted to open said dispensing valve, metering means responsive to the quantity of liquid in said cup, said first control means being also connected and responsive to said metering means, whereby the valve is closed when the cup is filled to a predetermined amount, said housing dispensing opening including a door, cup advancing means being adapted for movement from adjacent the rear of said housing to a forward access position outside of said housing door, said cup advancing means also being connected and responsive to said metering means, whereby when a cup receives a predetermined amount of liquid said cup advancing means is actuated, actuating means connected to said door adapted to open said door and being responsive to said cup advancing means.

4. A liquid dispensing apparatus, comprising in combination, a housing including a dispensing opening, a support assembly within the housing carrying a number of cups in stacked relationship, releasing means for releasing the cups one at a time, said released cup being adapted to pass along a predetermined path to liquid receiving position, first control means actuated by the passage of said cup through a portion of said path, a liquid container having an outlet, a dispensing valve controlling said outlet, means responsive to said first control means adapted to open said dispensing valve, metering means responsive to the quantity of liquid in said cup, said first control means being also responsive to said metering means, whereby said dispensing valve is closed when the cup is filled to a predetermined amount, said enclosure dispensing opening including a door, cup advancing means adapted for movement from adjacent the rear of said enclosure to a forward access position outside of said enclosure door, said cup advancing means also being responsive to said metering means, whereby when a cup receives a predetermined amount of liquid said cup advancing means is actuated; means for raising said enclosure door, said door raising means also being responsive to the movement of said cup advancing means, and timing control means adapted to actuate the said door raising means, whereby said door is raised as a cup is advanced towards said enclosure opening and is lowered as said cup reaches a predetermined position outside said enclosure door, said cup advancing means being responsive to said timing control means, whereby the cup advancing means returns within said enclosure after delivery of said cup, a primary controlling means operated by a coin release, said first control means being responsive to said primary controlling means.

5. A liquid dispensing apparatus as claimed in claim 4, wherein the control means disposed in said guiding path comprises a light source mounted at one side of said guiding path and a photoelectric cell disposed at the other side of said path whereby the passage of a cup along said path is adapted to break a beam of light from said light source, and circuit means between said light source, photoelectric cell and said valve releasing means.

6. A liquid dispensing device as claimed in claim 4, wherein the support assembly within said enclosure includes a pair of opposed rotatable annular members each adapted to support a plurality of cups in stacked relationship, said annular members being interconnected for partial counter rotation relative to each other, means to actuate said annular members, and said cup releasing means comprises super-imposed sets of movable fingers mounted for pivotal movement beneath each of said annular members and adapted on partial rotation to alternatively release a cup from each of said stacks in sequence.

7. A liquid dispensing apparatus, comprising in combination, a housing including a dispensing opening, a support assembly within the enclosure carrying a number of cups in stacked relationship, releasing means for releasing the cups one at a time, guiding means for guiding the released cup from said supporting means along a predetermined path into liquid receiving position, first control means actuated by the passage of said cup through a portion of said path, a liquid container having an outlet, a dispensing valve controlling said outlet, means responsive to said first control means adapted to open said dispensing valve, means for retaining said cup in liquid receiving position while the liquid is being delivered from said valve, metering means responsive to the quantity of liquid in said cup, said first control means being also responsive to said metering means, whereby the valve is closed when the cup is filled to a predetermined amount, a door for closing said dispensing opening, cup moving means positioned beneath said cup retaining means and being adapted for movement from adjacent said cup retaining means to a forward position outside of said door, said cup advancing means also being responsive to said metering means, whereby when a cup receives a predetermined amount of liquid, said cup advancing means is actuated; means for raising said door, said door-raising means also being responsive to the movement of said cup advancing means, and timing control means adapted to actuate said raising means whereby the door is raised as a cup is advanced toward said enclosure opening and is lowered as said cup reaches a predetermined position outside said cabinet enclosure, said cup advancing means being responsive to said timing control means whereby the cup advancing means returns within said enclosure after delivery of said cup, a primary controlling means operated by a coin-release, said first control means being responsive to said primary controlling means.

8. A liquid dispensing apparatus as claimed in claim 7 wherein the control means disposed in said guiding path comprises a light source mounted at one side of said guiding path and a photoelectric cell disposed at the other side of said path whereby the passage of a cup along said path is adapted to break a beam of light from said light source, and circuit means between said light source, photoelectric cell and said valve releasing means.

9. A liquid dispensing apparatus as claimed in claim 7, wherein said valve releasing means includes an electrical solenoid, circuit means connecting said solenoid to said first control means, the plunger of said solenoid being pivotally connected by a link arm to one end of a rotatable shaft, a lever arm connected to the other end of said rotatable shaft, a valve release arm mounted for pivotal movement within said enclosure in alignment with said container release valve and being pivotally connected to said lever arm, whereby energization of said solenoid is adapted to rotate said shaft and urge said valve release arm outwards to depress said container release valve.

10. A liquid dispensing apparatus as claimed in claim 7 wherein said metering means comprises a weighing table mounted for pivotal movement within said enclosure directly beneath said cup guiding means, an electrical switch beneath said weighing table adapted to be actuated when contacted by said table as it pivots under the weight of liquid delivered to a cup supported thereon, and circuit means connecting said switch to said valve releasing means.

11. A liquid dispensing apparatus as claimed in claim 7, wherein said enclosure door is mounted for sliding movement relative to said enclosure opening, and said door raising means includes a counterweight flexibly connected to said door adapted to initially raise said door, a guided door-returning frame mounted for sliding movement at each side of said slidably mounted door, pivotally mounted catch members on door returning frame, cam means adapted to engage and disengage said catch members with said frame, and driving means for said door returning frame, said driving means being connected to said cup advancing means.

12. An automatic liquid dispensing apparatus, comprising in combination, a housing including a dispensing opening, a support assembly within the enclosure carrying a number of cups in stacked relationship, releasing means for releasing said cups one at a time, guiding means for guiding the released cup from said supporting means along a predetermined path into liquid receiving position, control means actuated by the passage of said cup through a portion of said path, a liquid container having an outlet, a dispensing valve controlling said outlet, means responsive to said first control means adapted to open said dispensing valve, means for retaining said cup in liquid receiving position while the liquid is being delivered from said valve, said cup retaining means being mounted on a weighing table mounted for pivotal movement responsive to the quantity of liquid in said cup, said weighing table including a pair of spaced apart slots extending a major portion of its length, said first named control means being also responsive to the movement of said weighing table, whereby the valve is closed when the cup is filled to predetermined amount, said dispensing opening including a door, cup advancing means positioned beneath said cup retaining means and being adapted for movement through said slots from adjacent said cup retaining means to a forward position outside of said door, said cup advancing means also being responsive to said weighing table movement, whereby when a cup receives a predetermined amount of liquid, said cup advancing means is actuated; means for raising said door, said door raising means also being responsive to the movement of said cup advancing means, and timing control means adapted to actuate said door raising means whereby the door is raised as a cup is advanced towards said enclosure opening and is lowered as said cup reaches a predetermined position outside said cabinet, said cup advancing means being responsive to said timing control means whereby the cup advancing means returns within said enclosure after delivery of said cup, a primary controlling means operated by a coin release, said cup releasing means being responsive to said primary controlling means.

13. A liquid dispensing apparatus as claimed in claim 12, wherein said cup advancing means comprises a double helically threaded shaft mounted beneath said weighing table for horizontal rotation, a follower block mounted on said shaft and a follower pin in said block engaged with the threads of said shaft, a pair of cup advancing fingers mounted on said block and extending upwards therefrom through the slots of said weighing table and being adapted to travel the length of said table from beyond said cup retaining means to beyond said enclosure door, driving means adapted to rotate said shaft, circuit means between said driving means and said weighing table switch.

14. An automatic liquid dispensing apparatus as claimed in claim 12, wherein said door is mounted for sliding movement relative to said enclosure opening, and said door-raising means includes a counterweight flexibly connected to said door and adapted to initially raise said door, a guided door returning frame mounted for sliding movement at each side of said slidably mounted door, pivotally mounted catch members on said door returning frame, cam means mounted on said cabinet enclosure above and adjacent to said enclosure opening in the path of said door returning frame, and driving means for said door returning frame, said driving means being connected to said cup advancing frame, said driving means being connected to said cup advancing means.

15. An automatic liquid dispensing apparatus as claimed in claim 12, wherein said door returning frame driving means comprises a follower block mounted on a double helically threaded shaft disposed for vertical rotation beneath and transversely to said horizontal shaft driving said cup advancing fingers, said follower block being connected to said door returning frame, whereby rotation of said shaft causes reciprocal movement of said door returning frame.

16. A liquid dispensing apparatus comprising in combination, a housing, means within the housing for dispensing cups and for dispensing liquid into a cup released by the dispensing means, the housing including a door, said door being mounted for sliding movement relative to the enclosure opening, door raising means including a counterweight flexibly connected to said door adapted to initially raise said door, a guided door-returning frame mounted for sliding movement at each side of said slidably mounted door, pivotally mounted catch members on said door returning frame, cam means adapted to engage and disengage said catch members with said frame, and driving means for said door returning frame.

17. In a liquid dispensing apparatus, means for storing cups and for placing one cup after the other in liquid receiving position, means for dispensing liquid into the cup in liquid receiving position, metering means adapted to weigh said cup and liquid, and means for advancing the cup from liquid receiving position into access position, the cup advancing means comprising a double helically threaded shaft mounted beneath said weighing table for horizontal rotation, a follower block mounted on said shaft and a follower pin in said block engaged with the threads of said shaft, a pair of cup advancing fingers mounted on said block and extending upwards therefrom into alignment with said cup in liquid receiving position and being adapted to travel within said enclosure from beyond said cup liquid receiving position to a forward access position, driving means adapted to rotate said shaft, circuit means between said driving means and said metering means whereby actuation of said cup advancing means is responsive to said metering means.

18. A liquid container for dispensing apparatus of the type described in which the liquid container has a main body including a downward extending bulge on the bottom and an annular flange surrounding and extending downwardly below the container body proper, and a dispensing valve extending outwardly from the bulge portion of the bottom of the container to adjacent the annular flange, characterized by the structure in which the annular flange has a cut out portion covered with a supplementary superimposed skirt portion which is spaced from the normal flange portion and includes a hinged centre portion in alignment with the dispensing valve, whereby the skirt centre portion may be depressed against the valve in order to actuate the valve, said valve being normally screened by said skirt centre portion, and locking means on said skirt portion adapted for locking the centre portion against movement so as to prevent accidental actuation of the valve during transportation or installation of the container.

19. A dispensing apparatus having a housing enclosure which contains cup dispensing apparatus, a liquid container and means for dispensing liquid from the container into the cups, said housing having a main door hingedly mounted on it being adapted to open up the front of the cabinet to allow for the insertion or withdrawal of the liquid container, wherein the door includes a jamb remote from its pivotal connection with the housing, said jamb including a pair of spaced apart slots one adjacent the bottom and the other adjacent the top, a locking mechanism having spaced apart catch members adapted to engage said door jamb through each of said slots, an elongated link arm extending between and connecting said catch members for movement into and out of catching relationship with the door slots in synchronism, each of said catch members being pivotally mounted on the housing adjacent said door, an actuating rod connected to the link arm intermediate of its length adapted for moving the arm in such a manner as to move the catches into and out of door engaging position, said actuating rod being mounted on a rotatable shaft extending through the wall of the housing to a connection with a control knob outside the housing, a stop member pivotally mounted in the path of said rod and adapted to prevent movement of the rod, and a lock for holding the stop member in a fixed position preventing movement of said rod.

References Cited in the file of this patent
UNITED STATES PATENTS

| | | |
|---|---|---|
| 1,011,513 | Spuhl | Dec. 12, 1911 |
| 1,779,839 | Bigelow | Oct. 28, 1930 |
| 1,785,316 | Kimmel | Dec. 16, 1930 |
| 1,882,812 | Gunn | Oct. 28, 1932 |
| 1,895,745 | Asenbaum | Jan. 31, 1933 |
| 2,000,008 | Barbieri | May 7, 1935 |
| 2,000,556 | Brady | Sept. 20, 1935 |
| 2,005,938 | Graves | June 25, 1935 |
| 2,019,016 | McLellan | Oct. 29, 1935 |
| 2,050,131 | Skreta | Aug. 4, 1936 |
| 2,174,539 | Sutton | Oct. 3, 1939 |
| 2,233,796 | Pines | Mar. 4, 1941 |
| 2,237,411 | Carlson | Apr. 8, 1941 |
| 2,370,276 | Warren | Feb. 27, 1945 |
| 2,426,707 | Polsen et al. | Sept. 2, 1947 |
| 2,663,477 | Bendz | Dec. 22, 1953 |